(12) United States Patent
Gentry et al.

(10) Patent No.: US 9,381,862 B2
(45) Date of Patent: Jul. 5, 2016

(54) OPTICAL REFLECTOR WITH INCREASED FIELD-OF-VIEW

(71) Applicant: Gentex Corporation, Zeeland, MI (US)

(72) Inventors: Nathaniel J. Gentry, Zeeland, MI (US); Robert E. Roush, Jr., Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 14/340,771

(22) Filed: Jul. 25, 2014

(65) Prior Publication Data

US 2014/0334024 A1 Nov. 13, 2014

Related U.S. Application Data

(62) Division of application No. 13/279,256, filed on Oct. 22, 2011, now Pat. No. 8,817,356.

(60) Provisional application No. 61/406,488, filed on Oct. 25, 2010.

(51) Int. Cl.
*G02B 5/10* (2006.01)
*B60R 1/08* (2006.01)
(Continued)

(52) U.S. Cl.
CPC ... *B60R 1/08* (2013.01); *B60R 1/02* (2013.01); *B60R 1/06* (2013.01); *B60R 1/081* (2013.01);
(Continued)

(58) Field of Classification Search
CPC ............ G02B 5/10; G02B 5/08; G02B 17/02; G02B 17/06; F21V 7/00; F21V 7/04; F21V 7/09; B60R 1/006; B60R 1/02; B60R 1/06; B60R 1/08; B60R 1/008; B60R 1/081; B60R 1/082; B60R 1/12; G02F 1/153; Y10T 29/49826

USPC ......... 359/265, 267, 271, 838, 841, 864, 866, 359/868; 362/494, 509, 514, 516
See application file for complete search history.

(56) References Cited

U.S. PATENT DOCUMENTS 3,389,952 A * 6/1968 Tobin, Jr. ................ B60R 1/082
359/864
3,563,638 A * 2/1971 Panozzo ................ B60R 1/0605
248/479
(Continued)

FOREIGN PATENT DOCUMENTS

CA 2167893 1/1996
WO WO2012015134 2/2012

OTHER PUBLICATIONS

Stig Pilhall, "Improved Rearward View", Passenger Car Meeting, Dearborn, MI, Jun. 8-12, 1981, SAE Technical Paper Series, 10 pages.

(Continued)

*Primary Examiner* — Loha Ben
(74) *Attorney, Agent, or Firm* — Price Heneveld LLP; Scott P. Ryan

(57) ABSTRACT

An optical element such as a reflector defining a differentiable fiducial surface having a first portion, with a flat region, that seamlessly adjoins, along a curved line, a second portion having a two-dimensionally curved region. The quality of optical imaging in the reflector is drastically improved by reducing the ratio of optical powers measured in two perpendicular directions along the two-dimensionally curved portion of the surface. The vehicular rearview assembly including such a reflector possesses a field-of-view (FOV) that is significantly higher than the FOV of a conventional flat mirror and facilitates visual access to a "blind spot" behind the vehicle.

19 Claims, 18 Drawing Sheets

(51) Int. Cl.
*F21V 7/00* (2006.01)
*G02B 5/08* (2006.01)
*B60R 1/02* (2006.01)
*B60R 1/06* (2006.01)
*G02B 17/06* (2006.01)
*F21V 7/09* (2006.01)
*G02F 1/153* (2006.01)

(52) U.S. Cl.
CPC . *B60R 1/082* (2013.01); *G02B 5/08* (2013.01); *G02B 5/10* (2013.01); *G02B 17/06* (2013.01); *F21V 7/09* (2013.01); *G02F 1/153* (2013.01); *Y10T 29/49826* (2015.01)

(56) References Cited

U.S. PATENT DOCUMENTS

| | | | |
|---|---|---|---|
| 4,264,144 | A | 4/1981 | McCord |
| 4,331,382 | A | 5/1982 | Graff |
| 4,449,786 | A | 5/1984 | McCord |
| 5,563,744 | A * | 10/1996 | Matsumiya ............ B60R 1/081 248/479 |
| 5,621,569 | A | 4/1997 | Schlenke |
| 5,825,455 | A | 10/1998 | Fecteau et al. |
| 5,980,050 | A | 11/1999 | McCord |
| 6,033,518 | A | 3/2000 | Backfish |
| 6,141,137 | A | 10/2000 | Byker et al. |
| 6,288,825 | B1 | 9/2001 | Byker et al. |
| 6,522,451 | B1 * | 2/2003 | Lynam ................... B60R 1/082 248/549 |
| 6,661,559 | B2 | 12/2003 | Byker et al. |
| 6,717,712 | B2 | 4/2004 | Lynam et al. |
| 6,749,926 | B1 * | 6/2004 | Yoshizawa ................... 428/174 |
| 6,811,288 | B2 | 11/2004 | Hutzel |
| 6,932,483 | B2 | 8/2005 | Strumolo et al. |
| 7,012,729 | B2 | 3/2006 | Tonazzi et al. |
| 7,167,294 | B2 | 1/2007 | Lynam et al. |
| 7,234,825 | B2 | 6/2007 | Meng |
| 7,420,756 | B2 | 9/2008 | Lynam |
| 7,600,877 | B2 | 10/2009 | Behbehani |
| 7,842,154 | B2 | 11/2010 | Lynam |
| 8,128,243 | B2 | 3/2012 | Lynam |
| 8,128,244 | B2 | 3/2012 | Lynam |
| 8,147,077 | B2 | 4/2012 | Lynam |
| 8,180,606 | B2 | 5/2012 | Hicks |
| 8,267,534 | B2 | 9/2012 | Lynam |
| 8,562,157 | B2 * | 10/2013 | Lynam ..................... B60R 1/08 359/866 |
| 8,646,923 | B2 | 2/2014 | Hoeing et al. |
| 2002/0159169 | A1 | 10/2002 | McCord |

OTHER PUBLICATIONS

National Highway Traffic Safety Administration, 571.111 Standard 111, Rearview Mirrors, Apr. 7, 2010 version, 10 pages.
Michael J. Flannagan et al., "Distance Perception in Driver-Side and Passenger-Side Convex Rearview Mirrors: Objects in the Mirror Are More Complicated Than They Appear", The University of Michigan Transportation Research Institute, Ann Arbor, MI, Report No. UMTRI-97-32, Jul. 1997, 21 pages.

* cited by examiner

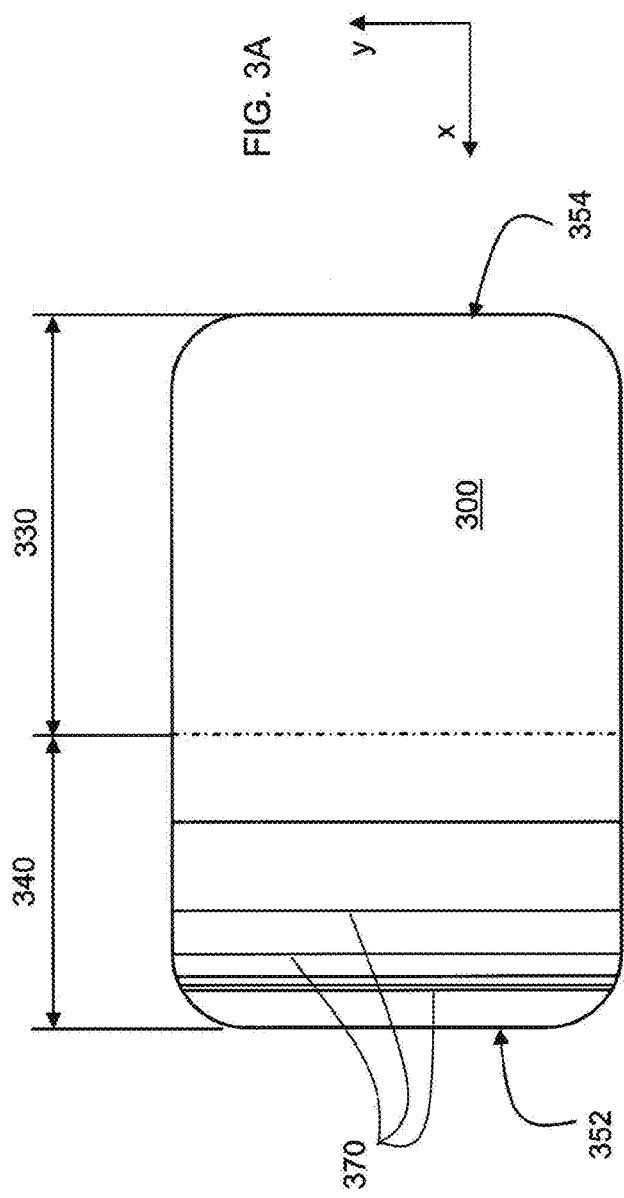
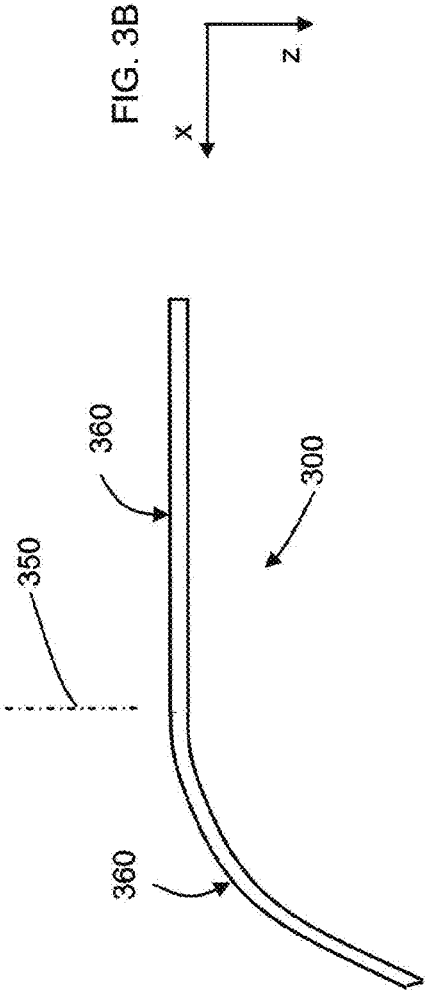

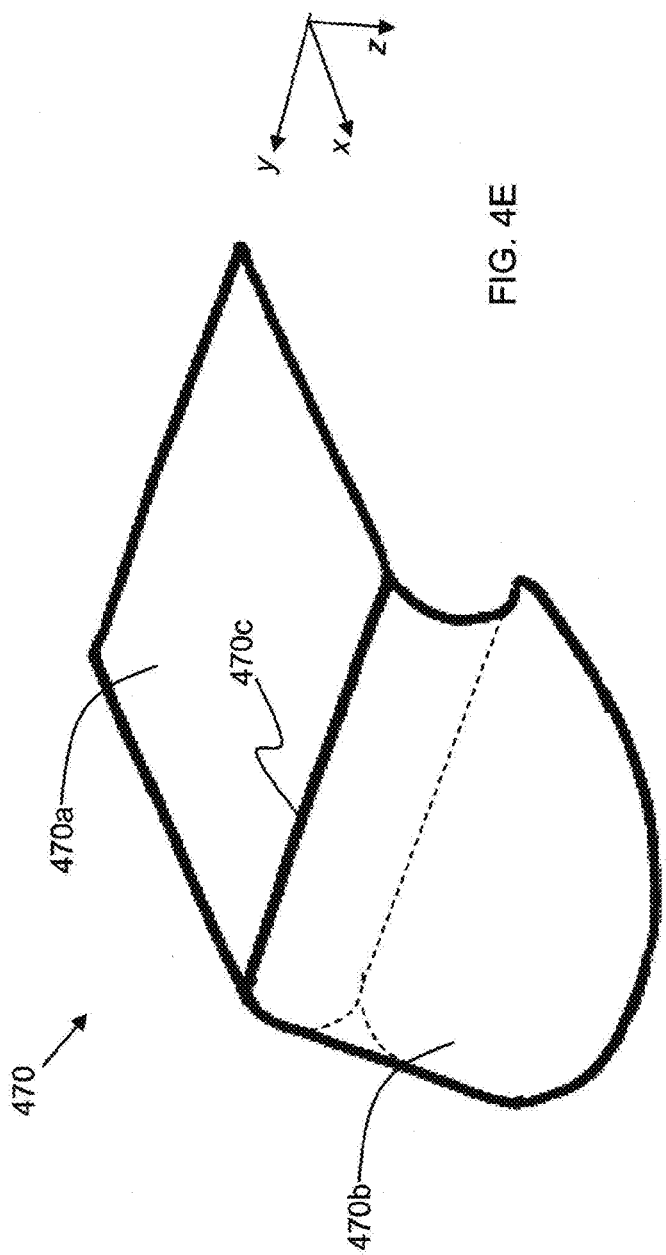
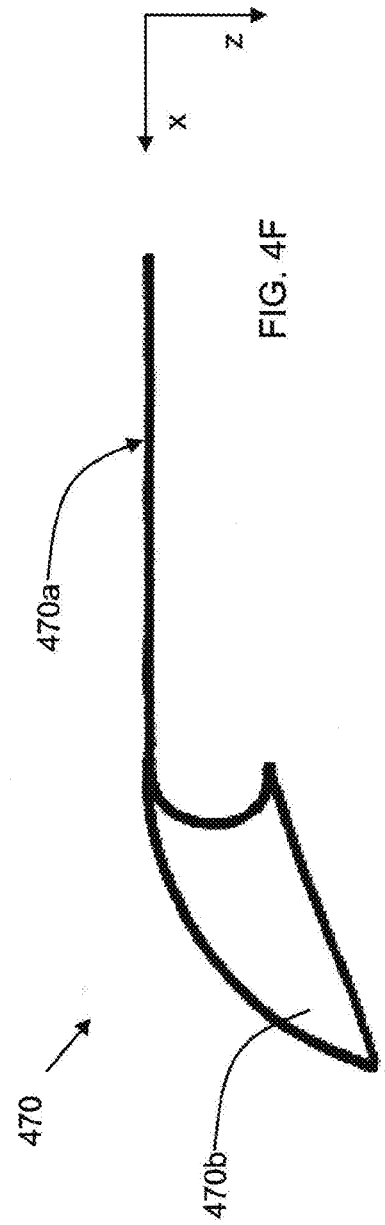
FIG. 4E
FIG. 4F

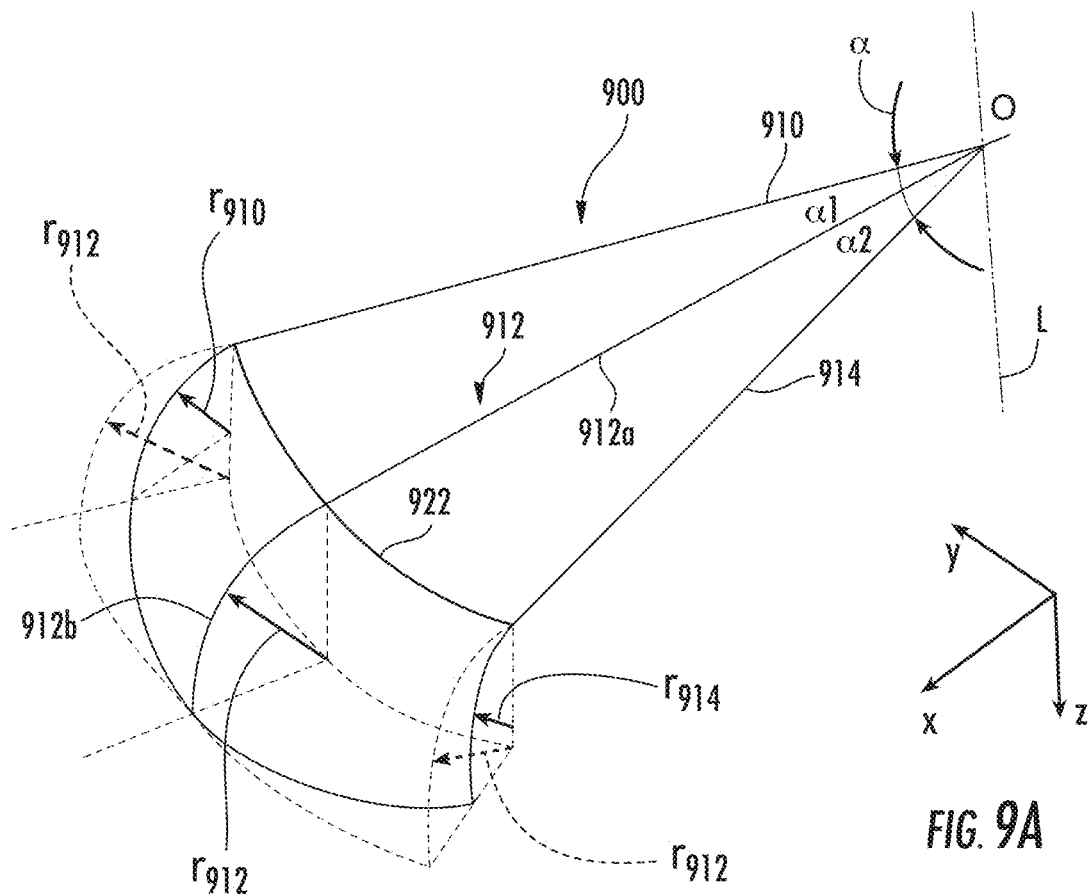
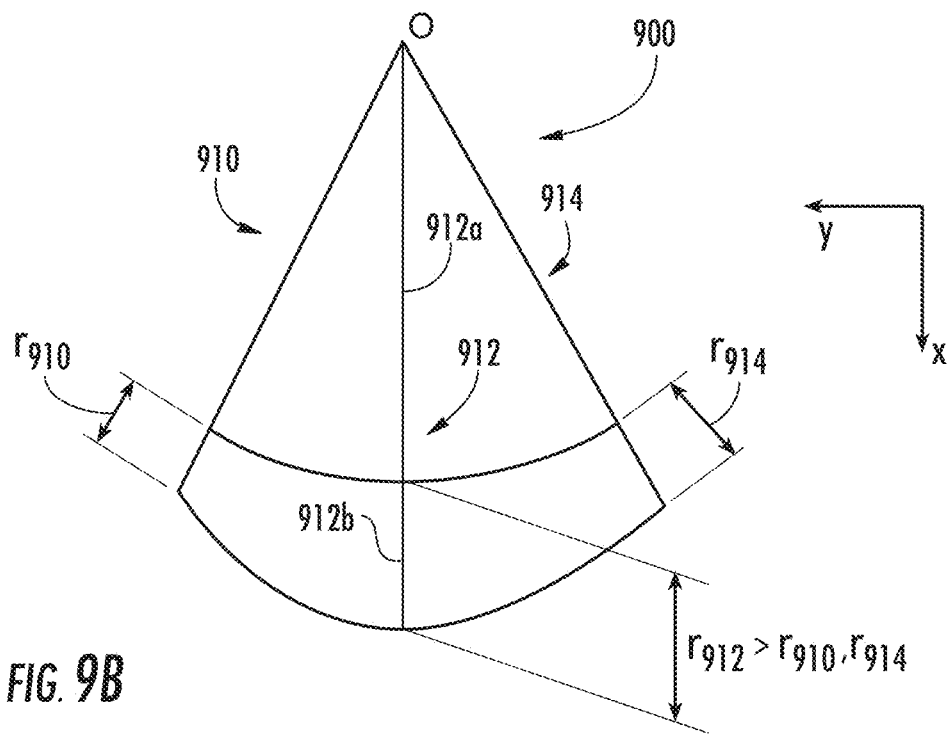
FIG. 9A
FIG. 9B

OPTICAL REFLECTOR WITH INCREASED FIELD-OF-VIEW

CROSS-REFERENCE TO RELATED APPLICATIONS

The present application is a divisional application under 35 U.S.C. §121 of U.S. patent application Ser. No. 13/279,256, filed Oct. 22, 2011, entitled "VEHICULAR REARVIEW MIRROR WITH INCREASED FIELD-OF-VIEW." U.S. patent application Ser. No. 13/279,256, now U.S. Pat. No. 8,817,356, claims the benefit of and priority under 35 U.S.C. §119(e) from U.S. Provisional Patent Application No. 61/406,488, filed Oct. 25, 2010, entitled "VEHICULAR REARVIEW MIRROR WITH INCREASED FIELD-OF-VIEW." The above-mentioned applications are incorporated herein by reference in their entirety.

TECHNICAL FIELD

The present invention relates to rearview automotive mirrors and, more particularly, to outside rearview mirrors having flat and curved portions configured to increase the field-of-view (FOV) for the driver.

SUMMARY OF THE INVENTION

Embodiments of the present invention provide a reflector, for use with a vehicular rearview assembly, that includes a substrate defining a fiducial surface having first portion with a flat surface region and a second portion having a two-dimensionally curved surface region such that the first and second portions seamlessly adjoin each other along either a straight or a curved line. Generally, the surface of the reflector is continuous and unitary and, in one embodiment, it is differentiable. The line along which the first and second portions adjoin each other may lie in the plane defining the flat surface region. In a specific embodiment, the line along which the regions of the surface of the reflector adjoin may include a circular arc having a radius generally between 150 and 1,000 mm (and, in some preferred embodiments greater than 300 mm and even more preferably greater than 500 mm).

In a specific embodiment, the surface of the reflector may be a portion or a segment belonging to a rotationally-symmetric surface, and the FOV of such a reflector may be at least 120 degrees. In yet another embodiment, the FOV of at least 26 degrees or even 29 degrees may be achieved. Generally, the reflector may be characterized with a FOV having a rate of change of substantially 3 degrees per 6 mm increment in a width of the second portion of the surface of the reflector.

In addition or alternatively, embodiments of the reflector of the invention have an optical power ratio defined as a ratio of optical power values that an embodiment has in two perpendicular directions along its surface. The second portion of the reflector has the ratio of optical powers (respectively measured in two orthogonal directions) that is less than 1,000, preferably less than 500, preferably less than 100, and most preferably less than 10. In addition, the flat surface region of the first portion of the surface of the reflector is generally flat and, in a specific embodiment, has an optical power averaged across the first portion with an absolute value not exceeding 0.25 diopter.

Embodiments of the present invention further provide a reflector for use with a vehicular rearview assembly and comprising a first substrate defining a first fiducial surface having a flat surface portion with a first perimeter and a two-dimensionally curved surface portion with a second perimeter, the first and second portions adjoining each other along a curved line that is common to the first and second perimeters; and a second substrate having a second fiducial surface that conforms to the first fiducial surface. In addition, the first and second substrates of such a reflector are disposed in a spaced-apart relationship so as to form a gap between the first and second surfaces, the gap being filled with an electrochromic (EC) medium. An EC-reflector of a specific embodiment may have a strip of spectral filter material circumferentially disposed on a surface of the first substrate, for example, in a form of a ring around the perimeter of the first substrate.

Furthermore, surfaces of substrates forming the EC-element of embodiments of a reflector have cross-sectional profiles that are closely matched across the surfaces thereby assuring that the gap is spatially uniform and has even thickness along the surfaces of the embodiments and that the reflector is devoid of visibly displeasing distortions of the image formed by such a reflector. In one embodiment, the surfaces of the substrates of the EC-element are tangentially parallel to one another. In a specific embodiment, the EC-element-containing reflector includes substrates that are coextensive and aligned so as to have the breaklines defining the corresponding surfaces of the substrates to be coextensive in a plane defining the substantially flat surface portion of either substrate.

Moreover, a specific embodiment of the reflector may be configured within a vehicular rearview assembly comprising at least one of a light source positioned to project light through the optical substrate, an illumination assembly, an icon, a power supply, a global positioning system, an exterior light control, a moisture sensor, an information display, a light sensor, a blind spot indicator, a turning signal indicator, a temperature indicator, an approach warning, an operator interface, a compass, a voice actuated device, a microphone, an electronic circuitry, a telecommunication system, a navigation aid, a lane departure warning system, an adaptive cruise control, a vision system, a tunnel detection system, and a heater.

Embodiments of the present invention also provide for a glass or plastic pre-form the unitary surface of which is rotationally-symmetric and includes an outer, peripheral portion that is curved in two dimensions and an inner portion that is flat, the outer and inner portions adjoining along a curved line. In addition or alternatively, embodiments of the invention provide for a mirror substrate that is a fragment or a portion or a part of such pre-form.

Embodiments of the invention also provide for a method for assembly of an optical reflector, which method includes (i) positioning first and second substrates that have, respectively, first and second differentiable surfaces, such as to define a spaced-apart and tangentially-parallel relationship between the first and second differentiable surfaces; and (ii) disposing an electrochromic (EC) medium in a gap between the first and second differentiable surfaces. The first differentiable surface includes a substantially flat portion and a second portion that is one-dimensionally (1D) curved, and the second differentiable surface includes another substantially flat portion and another portion that is one-dimensionally (1D) curved. The substantially flat and 1D-curved portions of the first differentiable substrate adjoin each other along a first line, and the substantially flat and 1D-curved portions of the second differentiable substrate adjoining each other along a second line.

An embodiment of the method may further contain a step of cutting at least one of the first and second optical substrates from a rotationally-symmetric pre-form. As used in this disclosure and the appended claims, the term "cutting" and the related terms are used in a general sense and refer to the process of carving out of, severing, separating, or removing a portion from a whole. An embodiment may additionally include a step of disposing at least one of reflective and electrically-conductive coatings on at least one of the differentiable surfaces of the first and second substrates. Moreover, in one embodiment, the method may include, alternatively or in addition, depositing a layer of substantially opaque material on a surface of the first substrate and configuring such layer as a ring around a perimeter of the surface that it is deposited on.

BRIEF DESCRIPTION OF THE DRAWINGS

The present invention will be more fully understood by referring to the following Detailed Description of Specific Embodiments in conjunction with the Drawings, of which:

FIGS. 3(A, B) are top and side views of an element of an embodiment of the present invention;

FIGS. 4(E, F) are different views of a surface corresponding to the fiducial surface of another embodiment of the invention;

FIGS. 9(C, D) illustrate a reference surface according to another embodiment of the present invention;

DETAILED DESCRIPTION OF SPECIFIC EMBODIMENTS

Figure 1:
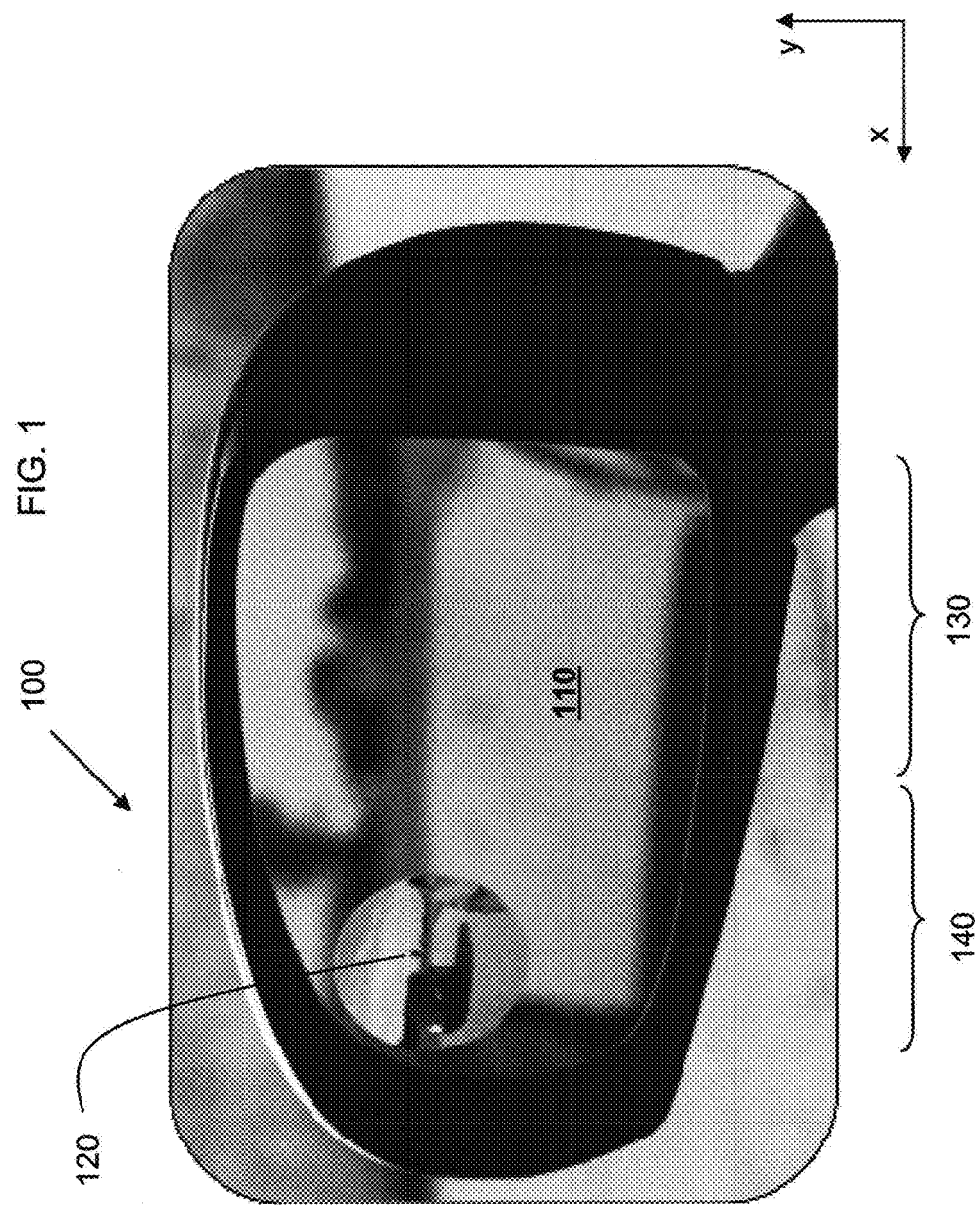
FIG. 1 is a view of an outside mirror with a "spotter"

Definitions. As used in this description and the accompanying claims, the following terms shall have the meanings indicated, unless the context requires otherwise:

"Transflective" refers to an optical configuration that reflects at least a portion of light incident from at least one side and transmits at least a portion of light incident from at least one side.

A "light source" generally refers to a device serving as a source of illumination inclusive of optical elements that may gate or shape the illumination. Thus, for example, an LED, or an LCD or any other display illuminated with the light from a light emitter is included within the meaning of a "light source." A light source may be used, e.g., for display of information, video images, or for illumination of an object, or an icon, or various vehicular indicia.

A "stand-alone" element of a mirror assembly is an element that, upon being fabricated, does not include any elements of the mirror assembly that serve purposes other than the purpose of the stand-alone element. A stand-alone element, when fabricated, can be inserted into the mirror assembly and removed from it without disturbing the performance of the remaining elements of the assembly. In comparison, an element may be integrated with another element of the mirror assembly: for example, a substrate for a mirror component may be simultaneously utilized as a substrate for an electro-optic cell, thus becoming one of the compound material components of the assembly.

As broadly used and described herein, the reference to an optical layer as being "carried" on a surface of a substrate refers to both electrodes or layers that are disposed directly on the surface of a substrate or disposed on another coating, layer or layers that are disposed directly on a surface of the substrate.

A "curve" (or "curved line") is a line that is generally not required to be straight. A curve may be two-dimensional (such a curve would lie in a plane and can be referred to as a plane curve) or three-dimensional (and can be referred to as a space curve). A plane curve or 2D-curve generally lies in a plane and has a one-dimensional curvature characterized by a radius. For example, a straight line is a 2D-curve having a curvature with a radius that is substantially infinite, while a circle corresponds to a 2D-curve having a given non-infinite radius. A 2D Archimedean spiral, described in polar coordinates by the equation $r=a+b\theta$, provides an example of a plane curve having a plurality of curvatures, each of which can be characterized with a corresponding radius. In comparison, a space curve or 3D-curve generally bends in two different directions, and thus has at least one two-dimensional curvature characterized by radii in two different dimensions. A helix, described in Cartesian coordinates by the following parameterizations:

$$x(t)=\cos(t), y(t)=\sin(t), z(t)=t$$

provides an example of a 3D-curve having curvatures in two dimensions.

To say that a surface is "two-dimensional" means that, about each point on the surface, there is a coordinate patch on which a two-dimensional coordinate system is defined. For example, the surface of the Earth is (ideally) a 2D spherical surface in a three-dimensional (3D) space, and latitude and longitude provide coordinates on it. A two-dimensional surface may be one-dimensionally (1D) curved or, put differently, have a one-dimensional curvature (for example, a cylindrical surface has a non-zero curvature in a cross-section that is perpendicular to the axis of the cylindrical surface but has no curvature in a perpendicular cross-section). A two-dimensional surface may be two-dimensionally curved (or, stated alternatively, have a curvature in two dimensions. An example of a two-dimensional surface is provided by a spherical surface the curvatures of which in two orthogonal cross-sections are equal. Another example of a two-dimensional surface is provided by a surface of an oblong football, the curvatures of which corresponding to two orthogonal cross-sections are different.

"Generating curve" or "generating line" generally refers to a curve or a line that, when being moved in space, traces or generates a figure or a surface. For example, a rotationally-symmetric surface can be traced or generated by rotating a chosen generating curve about a chosen axis.

A "differentiable" surface is a surface described by a function, a derivative of which exists at any point along the surface. Similarly, a "differentiable" curve is a curve described by a function a derivative of which exists at any point along the curve.

Two lines (or two surface areas) can be considered substantially coextensive if projections of these lines (or surface areas) on a chosen plane substantially coincide.

The term "field of view" (FOV) refers to an angular or, alternatively, linear extent of space observable in reflection off of the reflector. For example, the FOV of the vehicular rearview mirror corresponds to an angular extent of space behind the driver and visible to the driver in reflection off the rearview mirror at any given moment.

Numbering of structural surfaces. In describing the order of elements or components in embodiments of a vehicular rearview assembly or a sub-set of a vehicular rearview assembly, the following convention will be generally followed herein, unless stated otherwise. The order in which the surfaces of sequentially positioned structural elements of the assembly (such as substrates made of glass or other translucent material) are viewed is the order in which these surfaces are referred to as the first surface, the second surface, the third surface, and other surfaces if present referred to in ascending order. Generally, therefore, surfaces of the structural elements (such as substrates) of an embodiment of the present invention are numerically labeled starting with a surface that corresponds to the front portion of a rearview assembly and that is proximal to the observer or user of the assembly and ending with a surface that corresponds to the back portion of an assembly and that is distal to the user. Accordingly, the term "behind" refers to a position, in space, following something else and suggests that one element or thing is at the back of another as viewed from the front of the rearview assembly. Similarly, the term "in front of" refers to a forward place or position, with respect to a particular element as viewed from the front of the assembly.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and/or in reference to a figure, is intended to provide a complete description of all features of the invention.

In addition, in drawings, with reference to which the following disclosure may describe features of the invention, like numbers represent the same or similar elements wherever possible. In the drawings, the depicted structural elements are generally not to scale, and certain components are enlarged relative to the other components for purposes of emphasis and understanding. It is to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view in order to simplify the given drawing and the discussion, and to direct the discussion to particular elements that are featured in this drawing.

A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed.

Furthermore, the described features, structures, or characteristics of the invention may be combined in any suitable manner in one or more embodiments. For example, to simplify a particular drawing of an electro-optical device of the invention not all thin-film coatings (whether electrically conductive, reflective, or absorptive or other functional coatings such as alignment coatings or passivation coatings), electrical interconnections between or among various elements or coating layers, elements of structural support (such as holders, clips, supporting plates, or elements of housing, for example), or auxiliary devices (such as sensors, for example) may be depicted in a single drawing. It is understood, however, that practical implementations of discussed embodiments may contain some or all of these features and, therefore, such coatings, interconnections, structural support elements, or auxiliary devices are implied in a particular drawing, unless stated otherwise, as they may be required for proper operation of the particular embodiment.

Moreover, if the schematic flow chart diagram is included, it is generally set forth as a logical flow-chart diagram. As such, the depicted order and labeled steps of the logical flow are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Without loss of generality, the order in which processing steps or particular methods occur may or may not strictly adhere to the order of the corresponding steps shown.

While the present disclosure is made mostly in reference to outside rearview elements and assemblies incorporating such elements, it is appreciated that the scope of the invention also includes interior elements and assemblies incorporating such elements.

The invention as recited in claims appended to this disclosure is intended to be assessed in light of the disclosure as a whole.

Throughout the present application references are made to Canadian Patent No. 1,300,945; U.S. Pat. Nos. 5,204,778; 5,451,822; 6,386,713; 6,402,328; 6,441,943; 6,700,692; 7,511,872; 7,502,156; 7,602,542; 7,612,929; 7,688,495;

7,830,583; 7,864,398; 8,004,741; 8,035,881; 8,169,684; and 8,545,030; U.S. Patent Application Publication Nos. 2008/0302657 and 2010/0277786; and various patents and patent applications referred to in these patent documents. Aggregately, the above-mentioned patent documents are referred to as "the Prior Applications." The disclosures of each of the Prior Applications are incorporated herein by reference in their entirety.

Figure 7:
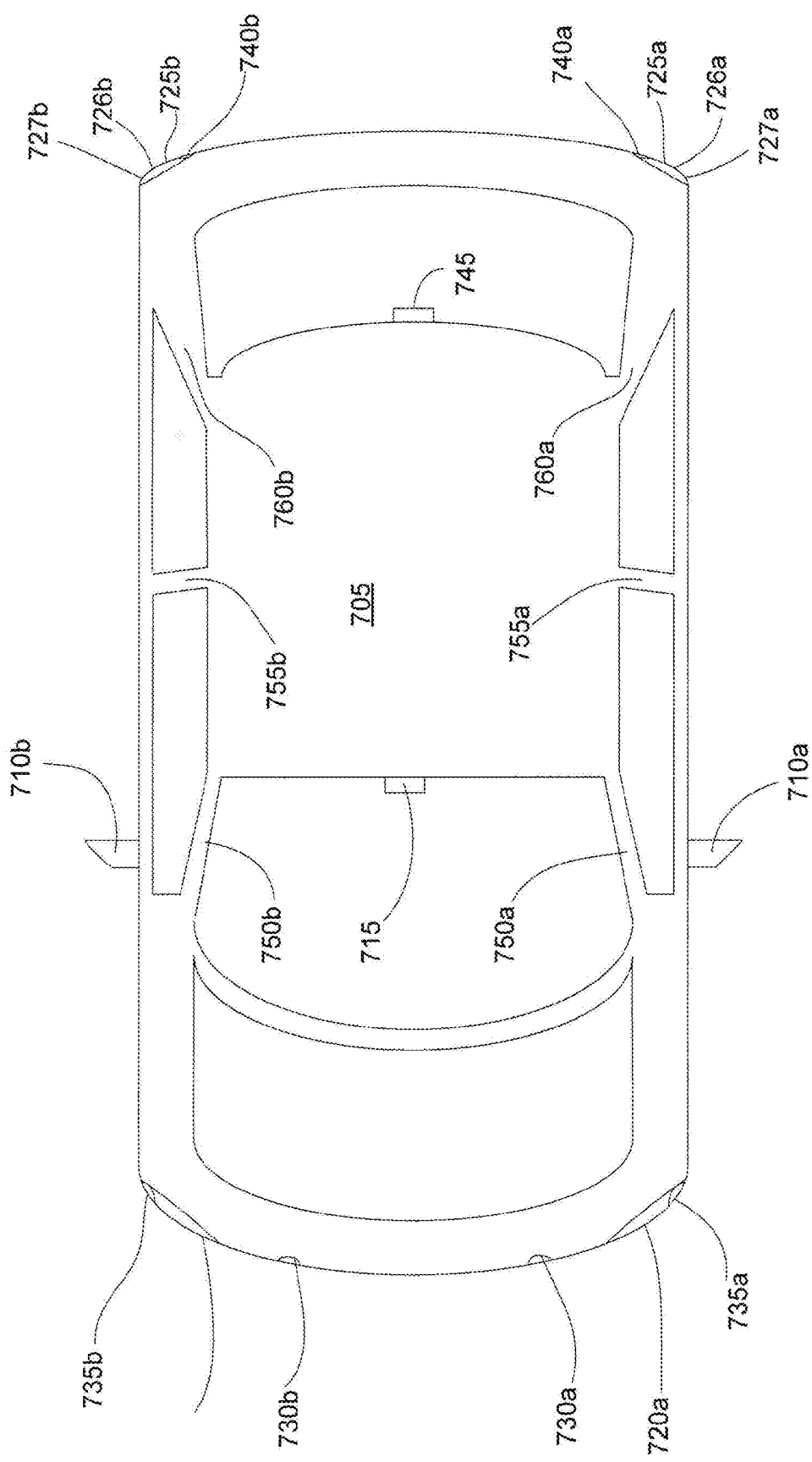
FIG. 7 is a schematic view of a controlled vehicle.

Referring initially to FIG. 7, there is shown a controlled vehicle 705 having a driver's side outside rearview assembly 710a, a passenger side outside rearview assembly 710b and an inside rearview assembly 715. Preferably, the controlled vehicle contains an inside rearview assembly with a mirror of unit magnification. A unit magnification mirror, as used herein, means a plane or flat mirror with a reflective surface through which the angular height and width of an image of an object is equal to the angular height and width of the object when viewed directly at the same distance with the exception for flaws that do not exceed normal manufacturing tolerances. A prismatic day-night adjustment rearview mirror, in which at least one associated position provides unit magnification, is considered to be a unit magnification mirror. Major requirements to the rearview mirrors are listed in a standard established by the National Highway Traffic Safety Administration, Sec. 571.111 (referred to hereinafter as "Standard 111"). The inside mirror, for example, should preferably provide a field of view (FOV) with an included horizontal angle measured from the projected eye point of at least 20 degrees and a sufficient vertical angle to provide a view of a level road surface extending to the horizon beginning at a point not greater than 61 m to the rear of the controlled vehicle when the controlled vehicle is occupied by a driver and four passengers or the designated occupant capacity, if less, based on an average occupant weight of 68 kg. It should be understood that the line of sight may be partially obscured by seated occupants or by head restraints. The location of the driver's eye reference points are preferably in accordance with regulation or a nominal location appropriate for any 95th percentile male driver. Preferably, the controlled vehicle comprises at least one outside mirror of unit magnification, on the driver's side. Preferably, the outside mirror provides a driver of a controlled vehicle a view of a level road surface extending to the horizon from a line, perpendicular to a longitudinal plane tangent to the driver's side of the controlled vehicle at the widest point, extending 2.4 m out from the tangent plane 10.7 m behind the driver's eyes, with the seat in the rearmost position. It should be appreciated that, with the use of conventional rearview mirrors, the line of sight may be partially obscured by rear body or fender contours of the controlled vehicle. The area behind the vehicle that falls within the region between the reach of the FOV of the vehicular mirror and the limits of the driver's peripheral vision is also visually obscured (unless the driver turns his head), and is referred to hereinafter as a "blind zone", a "blind area", or a "blind spot." Preferably, the locations of the driver's eye reference points are in accordance with regulation such as those established by the National Highway Traffic Safety Administration or at a nominal location appropriate for any 95th percentile male driver. It should be appreciated that, with the use of conventional rearview mirrors, the line of sight may be partially obscured by rear body or fender contours of the controlled vehicle. The area behind the vehicle that falls within the region between the reach of the FOV of a vehicular mirror and the limits of the driver's peripheral vision is also visually obscured (unless the driver turns his head), and is referred to hereinafter as a "blind zone", a "blind area", or a "blind spot." Preferably, the locations of the driver's eye reference points are in accordance with regulation such as those established by the National Highway Traffic Safety Administration or at a nominal location appropriate for any 95th percentile male driver. Preferably, the passenger side mirror is not obscured by an unwiped portion of a corresponding windshield and is preferably adjustable by tilting in both horizontal and vertical directions from the driver's seated position. In at least one embodiment, the controlled vehicle contains a curved (for example, convex or aspheric) mirror installed on the passenger side. Preferably, the mirror is configured for adjustment by tilting in both horizontal and vertical directions. Preferably, each outside mirror comprises not less than 126 cm$^2$ of reflective surface and is located so as to provide the driver a view to the rear along an associated side of the controlled vehicle. Preferably, the average reflectance of any mirror, as determined in accordance with SAE Recommended Practice J964, OCT84, is at least 35% (40% for many European Countries). In embodiments where a rearview assembly is capable of multiple reflectance levels, such as those embodiments that employ an electro-optic mirror element, the reflectance level in the day mode shall be at least 35% (40% when for European use).

With further reference to FIG. 7, the controlled vehicle 705 may comprise a variety of exterior lights, such as, headlight assemblies 720a, 720b, foul conditions lights 730a, 730b, front turn signal indicators 735a, 735b, taillight assembly 725a, 725b, rear turn signal indicators 726a, 726b, rear emergency flashers 727a, 727b, backup lights 740a, 740b and center high mounted stop light (CHMSL) 745.

The controlled vehicle may also comprise at least one control system incorporating various components that provide shared function with other vehicle equipment. An example of one control system described herein integrates various components associated with automatic control of the reflectivity of at least one rearview mirror element and automatic control of at least one exterior light. Such systems may comprise at least one image sensor within a rearview mirror, an A-pillar, a B-pillar, a C-pillar, a CHMSL or elsewhere within or upon the controlled vehicle. Images acquired, or portions thereof, maybe used for automatic vehicle equipment control. The images, or portions thereof, may alternatively, or additionally, be displayed on one or more displays. At least one display may be covertly positioned behind a transflective, or at least partially transmissive, electro-optic element. A common controller may be configured to generate at least one mirror element drive signal and at least one other equipment control signal.

Figure 8A:
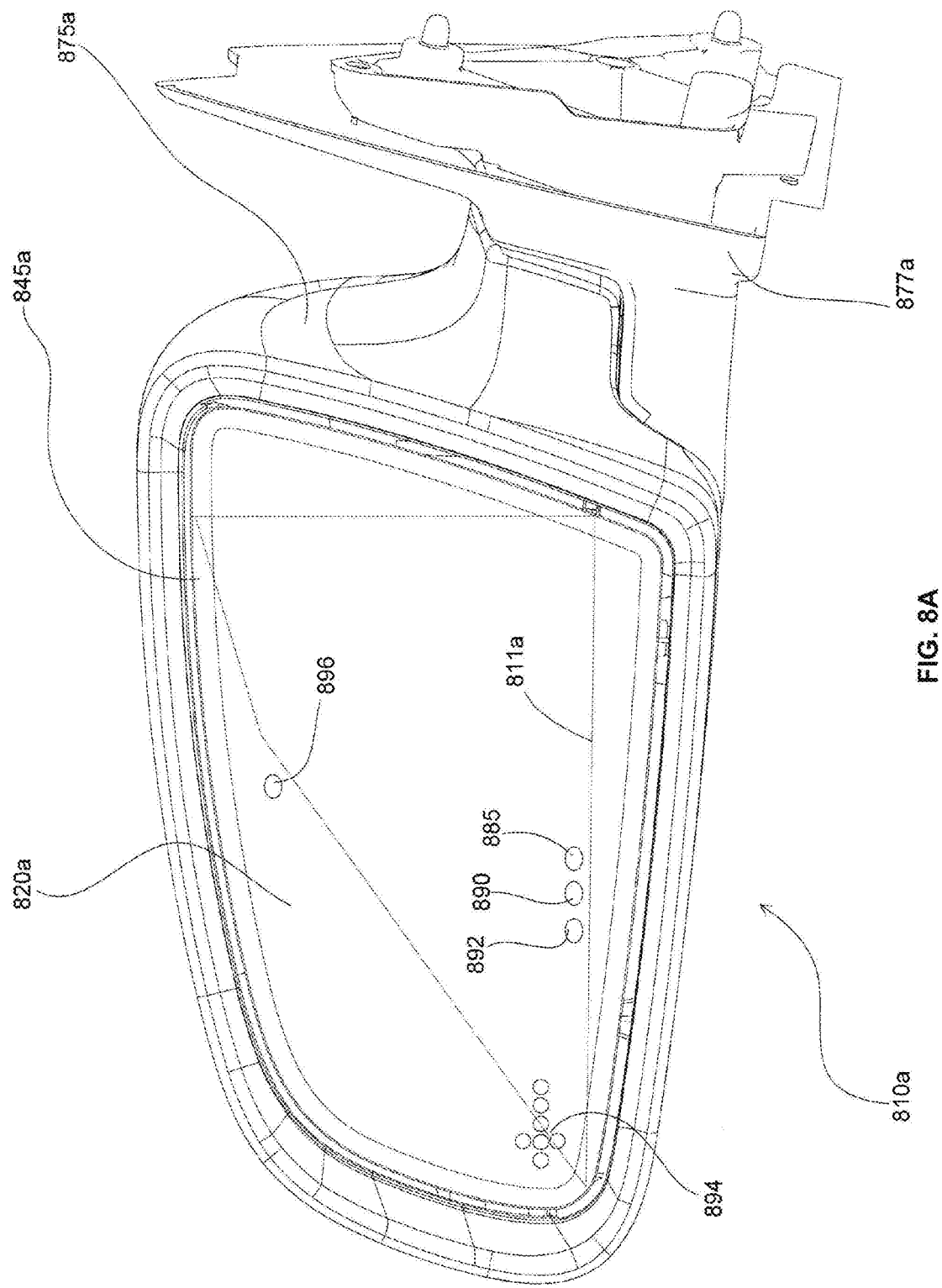
FIGS. 8(A, B) are illustrations of an outside rearview assembly.
Figure 8B:
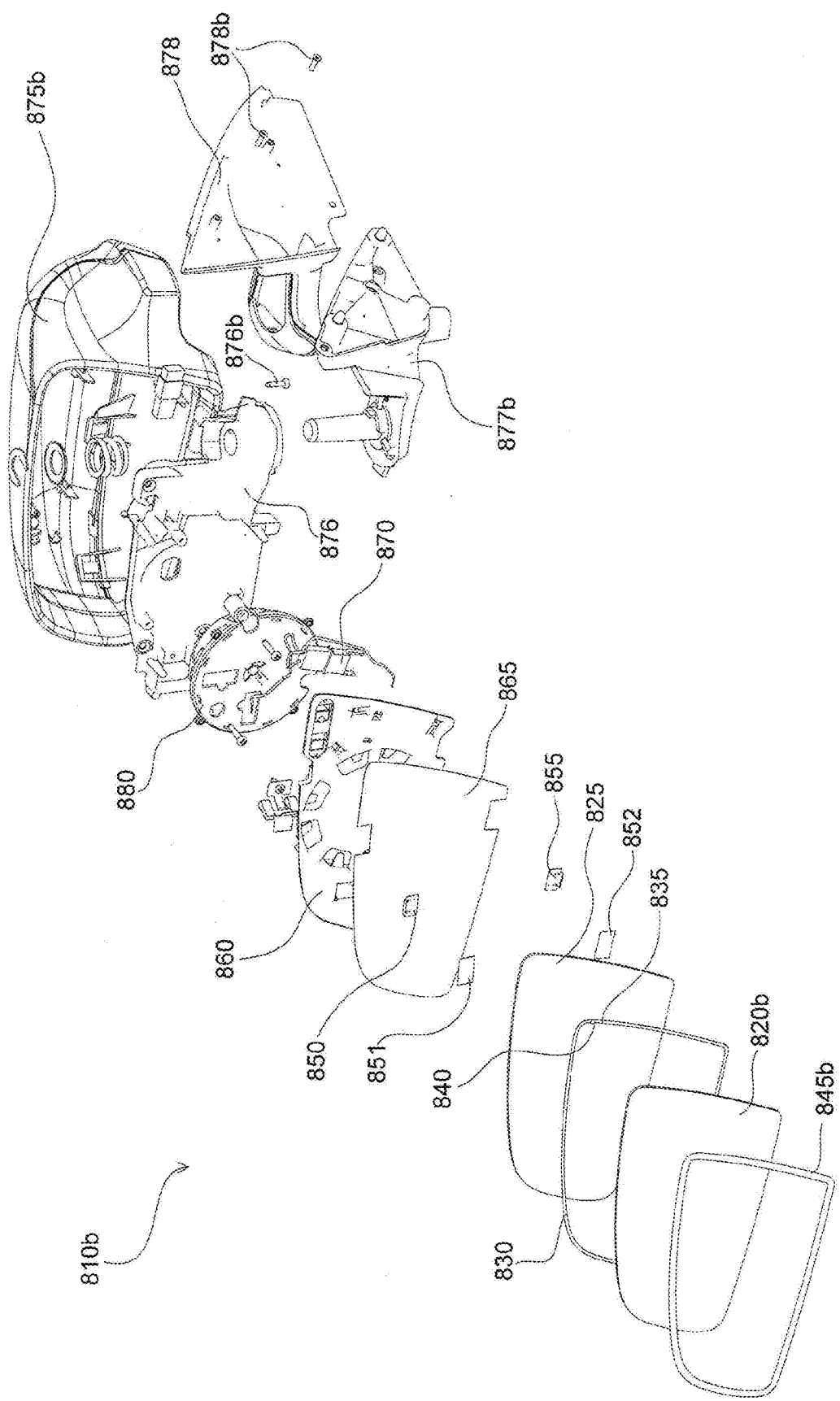

Turning now to FIGS. 8A and 8B, various components of an outside rearview assembly (ORA) 810a, 810b are depicted. An ORA containing an electro-optic element may include a first substrate 820a, 820b secured in a spaced-apart relationship with a second substrate 825 via a primary seal 830 to form a chamber therebetween. At least a portion of the primary seal is left void to form at least one chamber fill port 835. An electro-optic medium (such as, for example, an electrochromic medium) is enclosed in the chamber and the fill port(s) are sealingly closed via a plug material 840. Preferably, the plug material is a UV curable epoxy or acrylic material. Also shown is an optional spectral filter material 845a, 845b located in a peripheral portion of the element. The spectral filter material may be in a form of a strip or ring of substantially opaque, in the optical portion of the electromagnetic spectrum, material that is disposed circumferentially along or around a perimeter of the mirror element. Such a ring of the spectral filter material may be interchangeably referred to herein as a peripheral ring. Electrical clips 850, 855 are preferably secured to the element, respectively, via first adhesive material 851, 852. In an alternative embodiment, electrical clips may be configured as spring clips in order to ensure that they remain physically and electrically coupled to the electrode layers on the inward-facing surfaces of the electro-optic element. The element is secured to a carrier 860 via a second adhesive material 865. Electrical connections from the outside rearview mirror to other components of the controlled vehicle are preferably made via a connecter 870. The carrier is attached to an associated housing mount 876 via a positioner 880. Preferably, the housing mount is engaged with a housing 875*a*, 875*b* and secured via at least one fastener 876*a*. The housing mount may comprise a swivel portion configured to engage a swivel mount 877*a*, 877*b*. The swivel mount is preferably configured to engage a vehicle mount 878 via at least one fastener 878*a*.

With further reference to FIG. 8A, the outside rearview assembly 810*a* is illustrated to be oriented such that a view of the first substrate 820*a* is shown with the spectral filter material or peripheral ring 845 a positioned between the viewer and the primary seal material (not shown). A blind spot indicator 885, a keyhole illuminator 890, a puddle light 892, a turn signal 894, a photo sensor 896 such as a glare sensor (not shown), an illumination assembly (not shown), a display (not shown), a telemetry system (not shown), to name just a few, or a combination thereof may be incorporated within the rearview assembly such that these elements are positioned behind the mirror element with respect to the viewer. Preferably, the devices 885, 890, 892, 894, 896 are configured in combination with the mirror element to be at least partially covert when observed by the driver. Examples of various light-sensing electronic circuitry and other circuits capable of sensing glare and ambient light and supplying a drive voltage to the electro-optic element that may be incorporated in a rearview assembly have been described in the Canadian Patent No. 1,300,945; and U.S. Pat. Nos. 5,204,778; 5,451,822; 6,402,328; or 6,386,713.

Various mirror elements and systems that can be used with rearview assemblies of the present application, construction of such elements and systems including thin-film coatings and electrical connections, peripheral rings, light-sensing electronic circuitry and power supply systems, user interfaces, light sources and emitters for use with such elements and systems, and various arrangements for housing these elements and systems have been disclosed in various commonly assigned patent documents and others such as U.S. Pat. Nos. 6,402,328; 6,441,943; 6,700,692; 7,511,872; 7,502,156; 7,602,542; 7,612,929; 7,688,495; 7,830,583; 7,864,398; 8,004,741; 8,035,881; and 8,545,030; U.S. Patent Application Publication Nos. 2008/0302657 and 2010/0277786; Canadian Patent No. 1,300,945, and various patents and patent applications referred to in these patent documents.

An embodiment of a rearview assembly of the invention may include at least one of auxiliary devices and components such as, for example, at least one of an illumination assembly, a power supply, a global positioning system, an exterior light control, a moisture sensor, an information display, a light sensor, a blind spot indicator, a turning signal indicator, an approach warning, an operator interface, a compass, a temperature indicator, a voice actuated device, a microphone, a dimming circuitry, a navigation aid, a lane departure warning system, a vision system, and a tunnel detection system.

According to Standard 111, an outside rearview mirror (ORM) on the driver's side should provide for a unit magnification within the field-of-view (FOV) defined in Standard 111. The passenger side ORM may either provide a unit magnification or be convex. In certain circumstances, a passenger side mirror may not be required; in which case such mirror may be eliminated altogether or be aspheric. Generally speaking, a FOV in excess of 27 degrees, on either side of the vehicle, allows a driver to adequately address the blind-area concerns. Most OEM driver-side rearview mirrors produce a FOV in the range of 10 to 35 degrees. Simple flat mirrors produce a FOV in the range of about 10 to 18 degrees, depending on the mirror dimensions. This range can be increased by a 2-piece Platzer design (described, for example, in U.S. Pat. Nos. 6,315,419; 7,097,312; and 7,448,764; and U.S. patent application Ser. No. 12/054,960, now abandoned), a separate mirror that is curved to allow for viewing the blind area, or a "spotter" design (such as that disclosed in, for example, U.S. Pat. No. 7,748,856).

Flat mirrors have been used since Barney Oldfield's early race car days, and provide the mirror optics producing apparently undistorted images. However, a flat mirror surface of a limited size defines a limited FOV and leaves significantly large blind-areas on either side of the vehicle, as viewed by the vehicle operator. In Oldfield's day, that wasn't a serious problem. But in today's very congested multi-lane highway driving conditions, blind-areas contribute their share of risks. Given the mandate for unit magnification, what can be done to a flat outside mirror in order to increase its FOV is to make it wider and/or taller, or to move the mirror closer to the driver, all of which are subject to rather strict physical limitations imposed by the operation of such mirror in an actual vehicle. The size and position of the mirror influence not only the appearance of the vehicle but also its fuel efficiency. For these reasons, large outside mirrors are not preferred by automotive designers.

Adding, to a flat mirror, an optical element with characteristics different from that of the flat mirror provides an alternative solution. Such an alternative solution, however, may either cause an increase in the size of the mirror housing or complicate manufacturing of a rearview assembly.

The related art offers several solutions to increasing the FOV of the outside vehicular rearview mirror (ORM), in particular the ORM on the driver's side, by modifying the mirror's shape. One solution employs a combined mirror where at least one additional, smaller and typically curved (for example, convex) image-forming surface (often referred to as a "spotter" or spot-mirror) is disposed on and attached to the ORM typically within its outboard portion. An ORM can be generally described in terms of an inboard portion (a portion that is closer to the driver of the vehicle) and an outboard portion (a portion on the opposite side of the inboard portion with respect to the driver of the vehicle). The terms "inboard" and "outboard" are used hereinafter as they are defined in reference to FIG. 1. As shown in FIG. 1, for example, the ORM 100 incorporates several surfaces including the main substantially flat surface 110 and the surface of the spotter 120, and has an inboard portion 130 and an outboard portion 140. Similarly, the terms "horizontal" and "vertical", used in conjunction with a mirror substrate, denote the directions or orientations corresponding to extents of the ORM 100 of FIG. 1 along the x- and y-axes, respectively, where the x-axis is associated with a direction from the inboard portion of the mirror to the outboard portion. In reference to an ORM that has been affixed to or installed in the vehicle, the "horizontal" extent of the ORM corresponds to its extent parallel to the ground.

Figure 2:
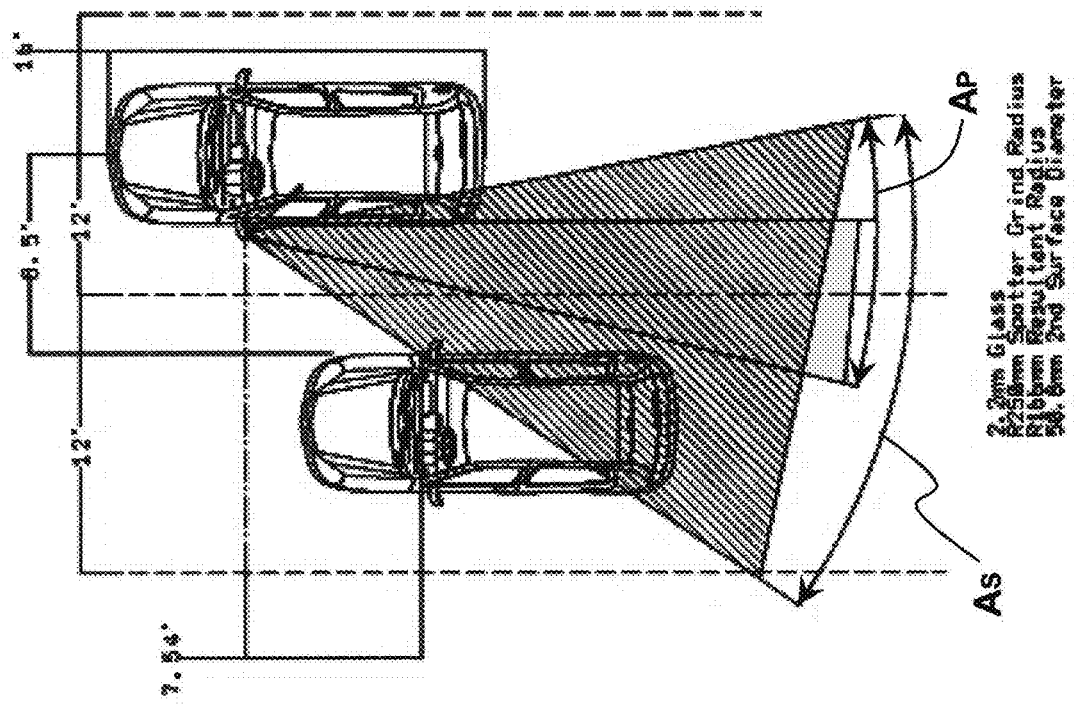
FIG. 2 illustrates a field-of-view and the blind spot for a vehicle.

The "spotter" 120 typically forms a separate image of the space behind the vehicle, which is independent from the image provided by the main reflecting surface 110 of the ORM 100, thereby somewhat "stretching" the effective FOV available to the vehicle operator into the blind-zone area, among other directions. As is schematically shown in FIG. 2, the spotter-FOV $A_S$ encompasses and extends the FOV $A_P$ of the primary, main area 110. There are various trade-offs accompanying the use of such curved spot-mirrors, including the fact that the apparent image size within the FOV of the "spotter" is sacrificed for the increase in the FOV, which negatively impacts the driver's distance judgment. (This problem, of course, is exacerbated as the object distance behind the vehicle is increased). Variations of the "spotter" solution include a spotter surface that is continuously and without spatial interruption integrated into the main portion of the mirror, and a spotter having more than one spotter pieces. (See, for example, U.S. Pat. Nos. 6,315,419; 7,097,312; 7,448,764; 7,167,294; 6,717,712; 6,522,451; and 7,748,856; and U.S. patent application Ser. No. 12/054,960, now abandoned).

Another general principle for increasing the FOV utilizes a continuously-curved ORM having a single complex surface that changes its curvature, in a continuous fashion, upon transition from an inboard portion of the mirror to an outboard portion of the mirror. With the use of such a continuously-curved ORM, the space outside of the vehicle can be observed without a visual break or interruption in the image, and the driver needs to observe only one image in the ORM to assess the traffic situation in the blind spot. The related-art mirrors conventionally fabricated according to this principle exhibit several operational drawbacks, as will be described below, including the astigmatism and distortion related to the process of optical image formation in such a mirror and the degree of evenness of the mirror surface.

The very nature of optical elements in an imaging system causes the system to contribute aberrations to an optical wavefront interacting with the system and various distortions to an image formed by the system. Unevenness and variations of optical power in different directions across the imaging system is quite common. For example, in the case of traditional astigmatism, a spherical wave incident upon an astigmatic imaging system is transformed to an emerging wave having a wavefront the radii of which are different in different planes. The practical consequence of this is such imaging of a plane object that the resulting image includes warped and irregular coaxial surfaces. In understanding and describing optical aberrations of an imaging system, various figures-of-merit (FOMs) can be used. For the purposes of the present application and the accompanying claims, one FOM chosen to describe the imaging properties of various embodiments is defined as the ratio of optical power values $P_{hor}/P_{ver}$ (optical power of an imaging element in a horizontal direction, $P_{hor}$, to that in a vertical direction, $P_{ver}$).

An example of a continuously-curved mirror configuration of the related art is a mirror having a reflecting surface with an inboard portion that has a flat surface area with a straight cross-sectional profile (or, in other words, an area described by a straight line), and an outboard portion that curves in one-dimension (where, for example, the outboard portion has a horizontal cross-sectional profile described by a plane curve of third degree and a vertical profile lacking any curvature and described by a straight line). This design, however, has an inherent drawback that significantly impairs the ability of the driver to assess traffic situations otherwise visually perceivable in the blind spot: optical aberrations characterizing such a continuously-curved ORM are quite severe due to the very same feature that affords this design an improved FOV.

Specifically, the radius of curvature of such a one-dimensionally-curved related-art mirror is constant throughout the outboard portion (in which case this flat-to-one-dimensionally-curved ORM can be said to have a cylindrical outboard portion) or varied (in which case this flat-to-one-dimensionally-curved ORM may be said to have a quasi-cylindrical (or resembling a cylindrical) outboard portion). In either case, because the curvature of the outboard portion measured in a horizontal direction is non-zero while the curvature in a perpendicular, vertical direction, is substantially lacking or at least approaching zero (which, in practice, corresponds to an extremely large or substantially infinite radius of curvature), such mirror is characterized by an optical power ratio $P_{hor}/P_{ver}$ that approaches infinity or, in practical terms, is extremely high, sometimes in excess of several tens of thousands units, as discussed below. To illustrate this situation, FIGS. 3A and 3B show front and side views of such a related-art embodiment 300 with an inboard portion 330 having a substantially flat surface area and an outboard portion 340 having a one-dimensionally (horizontally) curved surface. This mirror may be fabricated by bending a sheet of glass along a surface that has been generated by linearly translating a third-degree curve described above.

In order to ensure the visual continuity of an image formed in an ORM, the ORM-surface has to be differentiable. The practical implication of this requirement is that the surface of the ORM must be relatively smooth and not contain any visually-disruptive breaks, bends, cusps, or any points with a tangent that is perpendicular to the ORM. Put differently, such surface of the ORM should be without an edge within its bounds. This requirement imposes certain limitations on the transition between the inboard and outboard portions of the surface of the mirror. One can consider a boundary between the inboard and outboard portions, of an ORM having different curvatures, to be a boundary line that separates regions of the mirror having different curvature characteristics. Crossing such a boundary that lies in the surface of the mirror and that is referred to hereinafter as a breakline, is associated therefore with a transition from one region of the mirror to another (from an inboard portion to an outboard portion, or vice versa).

Referring again to the related-art embodiment 300 of FIGS. 3A, 3B, an outboard edge is shown as 352, an inboard edge is shown as 354, and lines 370 indicate the curvature of the outboard portion 340). To ensure the visual continuity of an image formed by the embodiment 300, a surface 360 of the mirror 300 has to be differentiable according to one embodiment of the invention. As a result, a breakline 350 along which the inboard and outboard portions 330 and 340 adjoin, is a straight line according to this embodiment.

Continuously-curved substrates for mirrors of the related art exhibit several additional shortcomings that can be attributed to the process of fabrication of such substrates. For example, it has been recognized that, during the process of bending of a sheet of glass to form a flat inboard portion and an outboard portion characterized by a curve of third degree (such as the embodiment 300 of FIGS. 3A, 3B), the area of the mirror adjoining the breakline inevitably suffers from surface distortions, which may result in additional annoying aberrations of an image, especially a portion of the image formed in a flat portion of the mirror.

A skilled artisan shall realize, therefore, that while currently available ORMs may provide for some increase in the FOV as compared with a conventional flat mirror, these ORMs have fundamental limitations, which are exacerbated during the process of fabrication of the mirror substrates by the process of bending the glass. Embodiments of the present invention aim to overcome technical problems encountered in efforts to produce an ORM—and, in particular, an auto-dimming ORM—that has an inboard portion with a substantially flat surface area and an outboard portion characterized by (i)

a significantly reduced optical power ratio across the outboard portion, and, in addition, (ii) by a greater FOV than that of a conventional flat ORM.

It was discovered that an ORM having such characteristics can be achieved with the use of a sheet of glass bent in such a fashion as to conform its surface to a pre-fabricated surface having inboard and outboard portions. As discussed herein, a sheet of glass is conformed to the fabricated surface as is known in the art. It is also known that once the heat is removed and all further processing (such as, for example, cooling, edge grinding, coating, cutting, and the like) is completed, the surface of the glass may no longer precisely conform to the shape of the pre-fabricated surface. It is also known that coatings that are applied to the glass surface either before or after the bending process may impact the ultimate shape of the glass substrate. By correctly designing a pre-fabricated surface, one may produce a glass substrate with a desired shape defined by such pre-fabricated surface to which the glass substrate is caused to conform. The surface of a single unitary glass substrate having a desired shape, as used herein, is referred to as the fiducial surface. In other words, a term fiducial surface refers to the intended shape of the glass substrate after it is removed from the pre-fabricated surface (to which it has been conformed) and after the required further processing steps are completed. It should be understood that different specific ORM glass substrates may have slight deviations from the fiducial surface due to manufacturing variability in the bending, coating, cutting and other standard processes.

The fiducial surface, being the surface of the glass substrate of the ORM, can be generally formed in different ways. For example, one can appropriately bend or form an individual sheet of glass having precisely defined dimensions corresponding to the dimensions of the sought-after ORM, in which case the resulting ORM glass substrate defines the fiducial surface. Alternatively, one can appropriately bend a pre-form sheet of glass that is larger than the required ORM glass substrate, and at least one individual ORM glass substrate can be cut from that pre-form. Such a pre-form can be only slightly larger than the required glass substrate for an ORM (in which case only one ORM glass substrate is produced) or it can be significantly larger than the ORM glass substrate. In the latter case, the pre-form can be designed to ensure that several ORM glass substrates can be cut from a single pre-form.

In particular, embodiments of an ORM glass substrate of the present invention have a differentiable fiducial surface with an inboard portion that has a substantially flat surface area meeting the FOV requirements laid out in Standard 111 and a curved outboard portion. For the purposes of the present disclosure and the appended claims, the term "substantially flat" as used in describing an optical surface (for example, in describing an inboard portion of the glass substrate used in an embodiment of the ORM) implies that optical power of such surface averaged across such surface does not exceed, in absolute terms, 650 millidiopter, is preferably no greater than 250 millidiopter, and most preferably does not exceed 100 millidiopter. It is further preferred that the rate of change of an optical power of such surface as a function of displacement across the surface does not exceed about 250 millidiopter per 10 mm of displacement and, preferably, does not exceed about 100 millidiopter per 10 mm of displacement and, in addition or alternatively, does not exceed about 10 millidiopter per 1 mm of displacement.

The change of apparent distance to the object, viewed in reflection from a reflector that has an (absolute value of) optical power of about 250 millidiopter by an observer who is located at about 1 m from the reflector, is about 25%. The change of apparent distance to the object, viewed in reflection from a reflector that has an (absolute value of) optical power of about 100 millidiopter by an observer who is located at about 1 m from the reflector, is about 10%. The latter is illustrated in Table 1.

TABLE 1

| Distance to Object (m) | Optical Power (diopter) of a reflector producing apparent distance scaling of 0.9 | Optical Power (diopter) of a reflector producing apparent distance scaling of 1.1 | Radius of surface of reflector (m, absolute value) |
| --- | --- | --- | --- |
| 1 | −0.100 | 0.100 | 20 |
| 2 | −0.100 | 0.100 | 20 |
| 3 | −0.100 | 0.100 | 20 |
| 5 | −0.100 | 0.100 | 20 |
| 10 | −0.100 | 0.100 | 20 |
| 50 | −0.100 | 0.100 | 20 |
| 100 | −0.100 | 0.100 | 20 |

Furthermore, it is presently preferred that the optical power ratio characterizing a two-dimensionally curved outboard surface portion of embodiments of the present invention does not exceed 1,000 across the outboard portion; is preferably less than 500; more preferably less than 100; and most preferably less than 10 across the outboard portion. In a specific embodiment, and as discussed in more detail below, the fiducial surface of the ORM has a curved breakline.

One embodiment of an ORM of the present invention includes an optically transparent substrate having a fiducial surface that does not lend itself to being a segment, a section, a fragment, or a slice of and that does not belong to another surface that is rotationally-symmetric about an axis that is transverse to the flat portion of the fiducial surface. In another embodiment, an ORM includes an optically transparent substrate having a fiducial surface that represents a segment, a section, a fragment, or a slice of another rotationally-symmetric surface. In one implementation, an ORM includes a single continuous substrate having a reflecting thin-film layer deposited thereon. In another implementation, an ORM of the invention includes an auto-dimming element having two spatially-conforming to one another substrates each of which includes a fiduciary surface according to an embodiment of the present invention. In a specific embodiment, the two substrates of such an auto-dimming element can be spatially coextensive and/or aligned with one another.

Figure 4A:
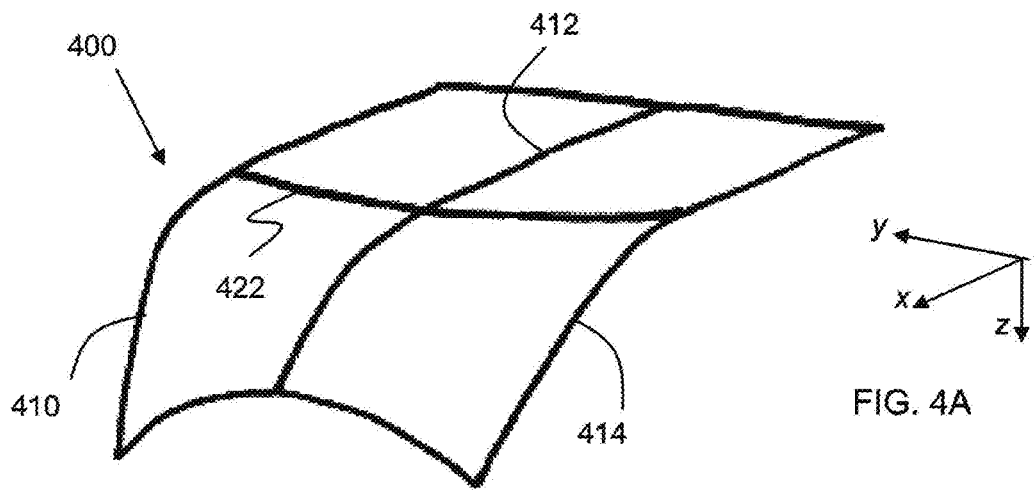
FIGS. 4(A-C) are different views of a surface corresponding to the fiducial surface of an embodiment of the invention.
FIG. 4D is a schematic view of a preform having a rotationally-symmetric surface according to an embodiment of the invention and a fragment of such preform to be used as a substrate of a mirror.
Figure 4B:
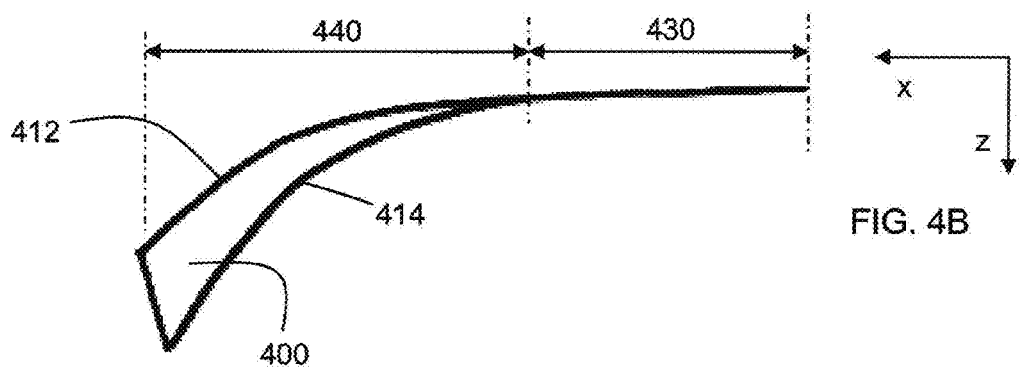
Figure 4C:
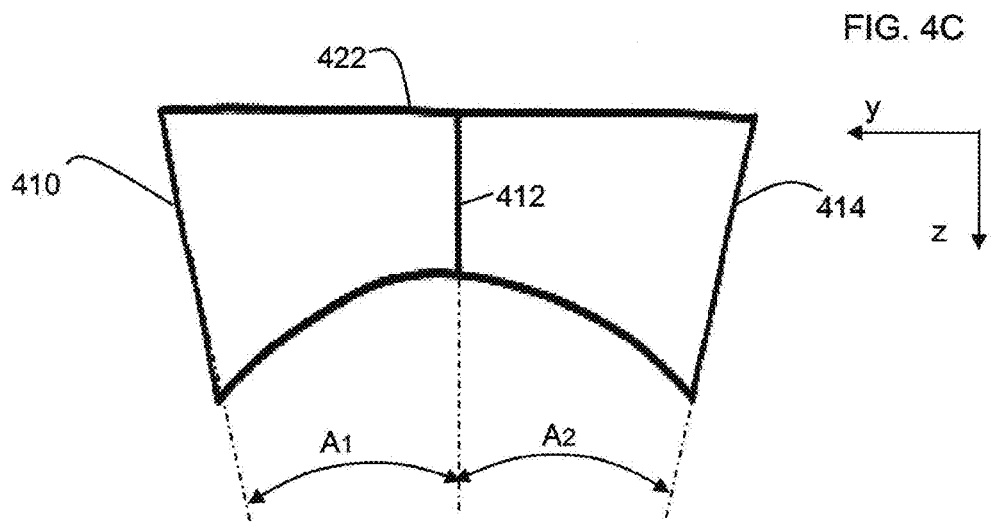

In reference to FIGS. 4A, 4B, and 4C, there is shown an embodiment of a fiducial surface 400 of the mirror substrate in perspective and two side views, respectively. The xz-plane is denoted as a horizontal plane and the x-axis extends in a horizontal direction, and the yz-plane is denoted as a vertical plane and the y-axis extends in a vertical direction. The generation of the two-dimensionally-curved pre-fabricated surface to which the surface 400 conforms may be accomplished, for example, by initially defining three spaced-apart limiting curves 410, 412, and 414, each of which has an extent in a horizontal direction (along the x-axis, as shown). The limiting curve 412 lies in a horizontal plane, while each of the limiting curves 410 and 414 lies in a corresponding plane inclined, with respect to the horizontal plane, by angles $A_1$ and $A_2$, respectively. In one embodiment, each of the curves 410, 412, and 414 is a third-degree curve described by $$y = R - \sqrt{R^2 - x^2} + a(x-b)^3, \quad \text{(Eq. 1)}$$

where the coefficients R, a, and b are different for different curves, and the absolute value of each of the angles $A_1$ and $A_2$ is chosen between zero and a limiting angle. In one embodiment, the limiting angle may be 15 degrees. An example of the coefficients for one embodiment is provided in Table 2. Connecting the limiting curves 410, 412, and 414 in a differentiable fashion causes the generation of the two-dimensionally curved profile. Further to such generation of the pre-fabricated surface, an individual piece of glass can be heated and bent or formed to spatially conform to the pre-fabricated surface, thereby resulting in an embodiment having the fiducial surface 400.

TABLE 2

|   | Curve 412 | Curve 410, 414 |
|---|-----------|----------------|
| R | 1.5e+11   | 1.5e+100       |
| a | 50        | 60             |
| b | 9e−6      | 5.75e−6        |

Figure 4D:
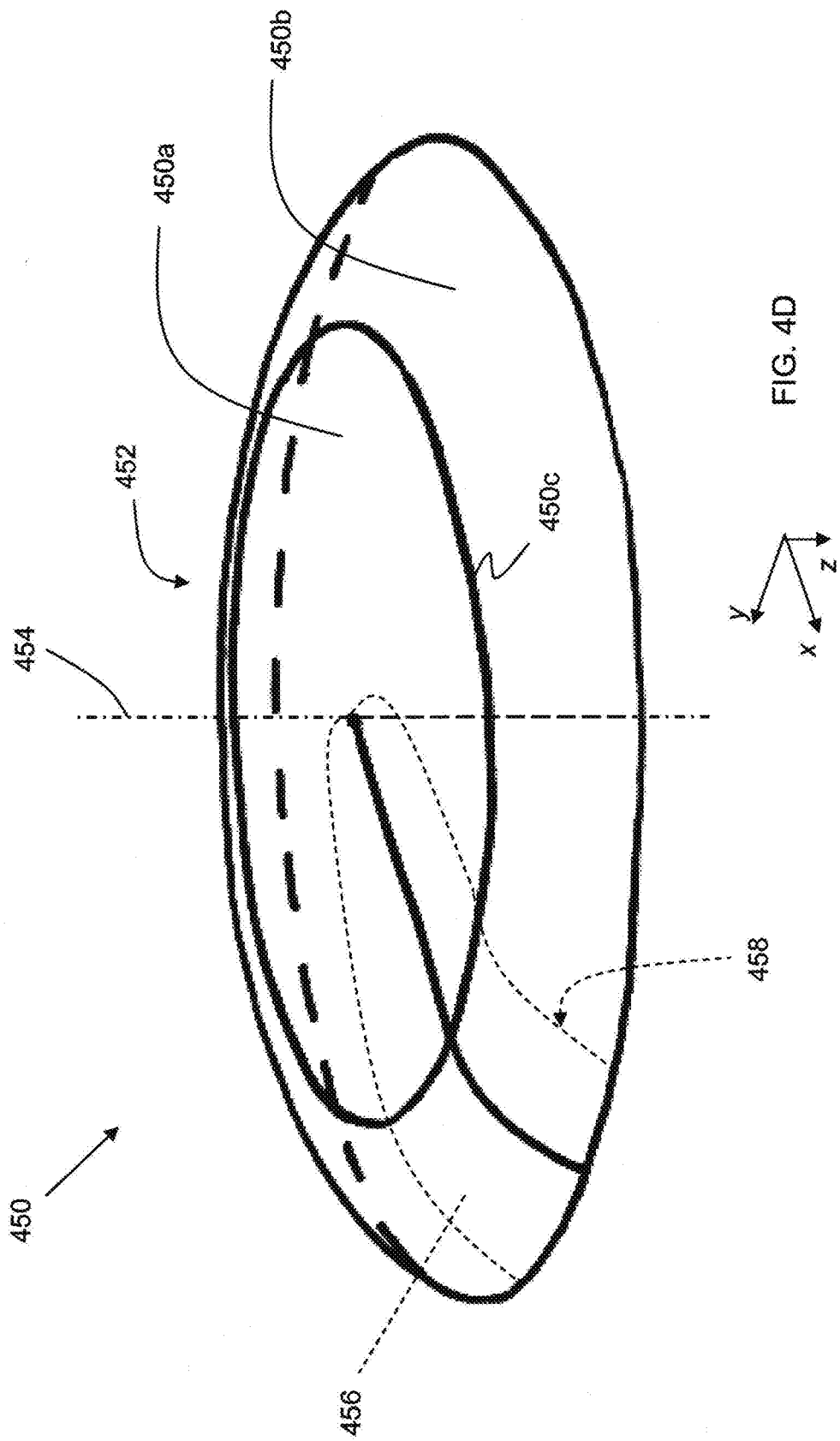

Generally, an embodiment of a fiducial surface of the present invention is such that a line tangential to such surface exists at any point along the fiducial surface and that the fiducial surface includes a flat surface region and a two-dimensionally-curved surface region that adjoin along a breakline belonging to a plane defining the flat region. In a preferred embodiment, the breakline is curved. A reference (pre-fabricated) surface to which such embodiment spatially conforms can be formed by, for example, rotating a limiting curve (for example, the limiting curve 412 of FIG. 4) about an axis that is transverse to the flat portion of the limiting curve. An extended piece of glass is then appropriately bent about the pre-fabricated surface to create a pre-form such as a preform 450 shown in FIG. 4D that has a first region 450a with a flat surface area and a second region 450b with a two-dimensionally curved surface area. The first and second regions 450a, 450b adjoin each other along a breakline 450c. A surface 452 of the pre-form 450 is rotationally-symmetric about an axis 454 that is transverse to the first region 450a. In one embodiment, an individual optical substrate is further formed by cutting, as is known in the art, an individual piece or segment or fragment 456 of this rotationally-symmetric preform 450 along an appropriate perimeter line 458. In a related embodiment, the pre-form 450 as a whole can be used as an optical substrate.

In another embodiment of the present invention, a reference surface having requisite characteristics in accordance with the present invention can be generated by linearly translating a generating plane curve that has a straight portion and a curved portion while changing the radius of curvature of the curved portion of such a curve. This embodiment is illustrated in FIGS. 4E and 4F, showing in perspective and side views the resulting axially-asymmetric surface 470 in which the first surface region 470a having a flat area and a second surface region 470b having a two-dimensionally curved surface area adjoin along a straight breakline 470c. Following the formation of such axially-asymmetric surface 470 according to an embodiment of the present invention, a hot piece of glass may be appropriately bent, as known in the art, to conform the surface of the glass substrate to the surface 470 thereby forming a substrate for an ORM.

In another embodiment of the present invention, a reference pre-fabricated surface having requisite characteristics can be generated by sweeping, in a rotational fashion about a chosen axis and within a specified angular range, a differentiable generating curve (having a straight portion and a circularly arced portion that is a continuation of the straight portion), while simultaneously continuously varying (for example, decreasing) the radius of the circularly arced portion from the starting value to the ending value as a function of an angle of rotation. An example of this embodiment of the reference surface is schematically shown in FIGS. 9A and 9B, showing a fiducial surface 900 in perspective and top views, respectively. The surface 900 is traced by sweeping a generating curve 912 (that has a straight portion 912a and an end portion 912b that is circularly curved at a radius $r_{912}$) about an axis L (that is transverse to the straight portion 912a) and within an angular range $\alpha = \alpha_1 + \alpha_2$ that is defined by the limiting curves 910 and 914. During such sweeping, however, while the radius of rotation remains constant and equal to the length of the straight portion 912a, the curvature of the circular end 912b is being changed, as a predetermined function of the sweeping angle. For example, as shown in FIGS. 9A, 9B, the curvature of the two-dimensionally curved portion of the surface 900 may be varied from $r_{912}$ to $r_{910} < r_{912}$ across one portion $\alpha_1$ of the sweeping range $\alpha$ and from $r_{912}$ to $r_{914} < r_{912}$ across another portion $\alpha_2$ of the sweeping range $\alpha$. The resulting surface 900, therefore, contains two portions: a first portion that has been generated by tracing the straight section 912a and that includes a flat region, and a second portion that seamlessly adjoins the first portion along a curved breakline 922 and that is two-dimensionally curved. It is appreciated that the surface 900 generated as described above does not constitute a segment or fragment of a rotationally-symmetric surface. Phrased alternatively, the surface 900 is not a part of a rotationally-symmetric surface. It is also understood that angular separation $\alpha_1$ between the curves 910 and 912 may differ from the angular separation $\alpha_2$ between the curves 912 and 914.

Figure 9C:
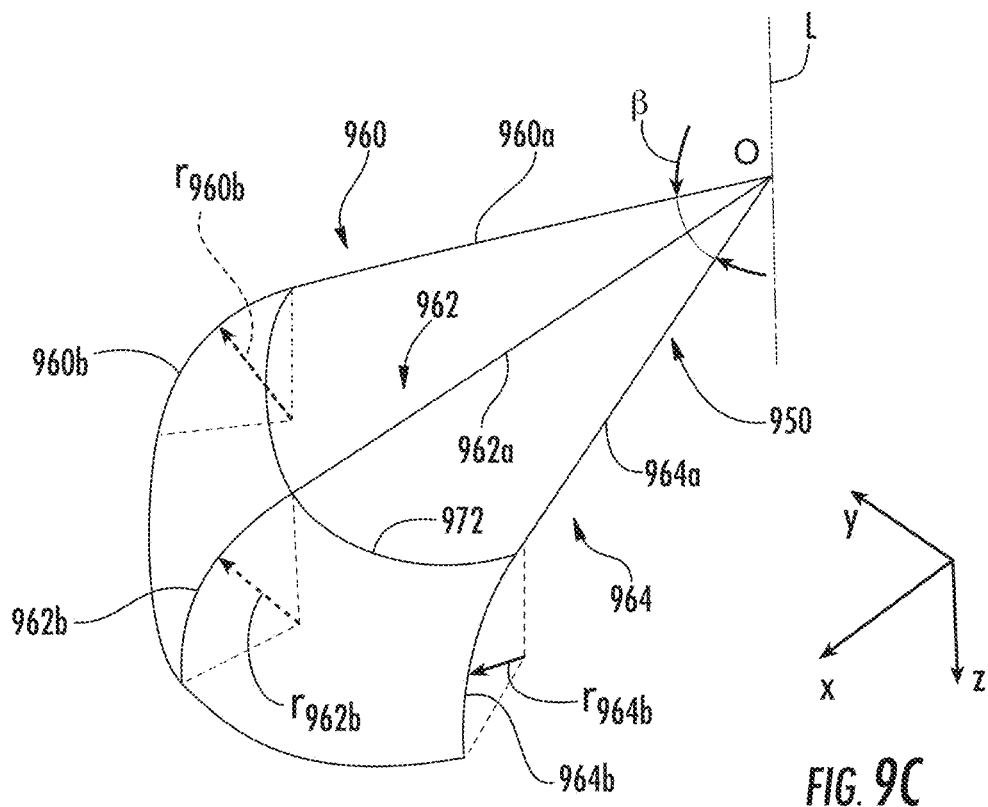
FIGS. 9(A, B) illustrate a reference surface according to an embodiment of the present invention.
Figure 9D:
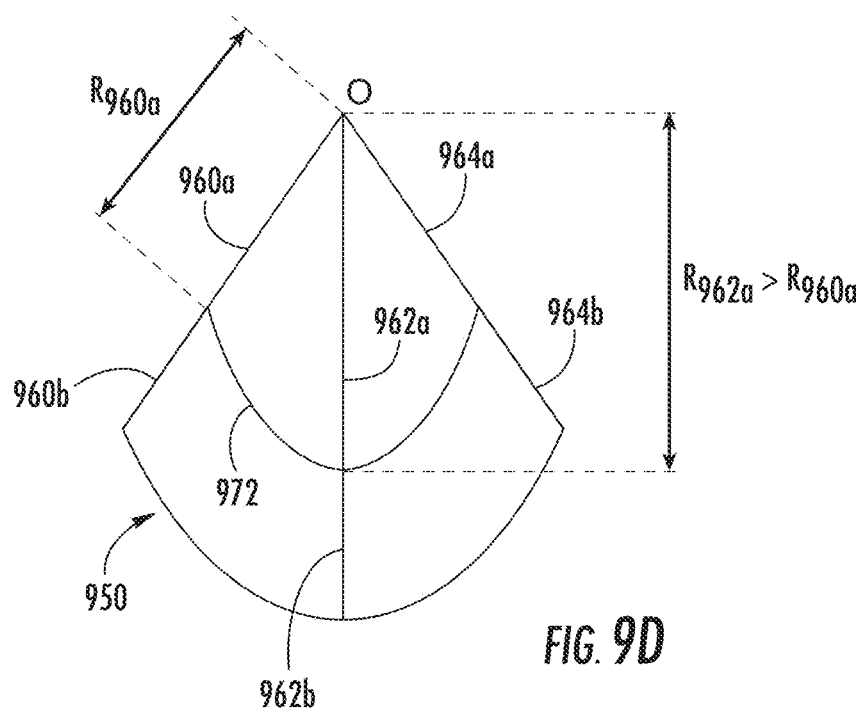

In yet another embodiment, a reference pre-fabricated surface can be generated by sweeping, in a rotational fashion about a chosen axis and within a specified angular range, a differentiable generating curve having a straight portion and an adjoining circularly arced portion, while simultaneously continuously decreasing the length of the straight portion of the generating curve as a function of an angle of rotation. An example of this embodiment 950 of the reference surface is schematically shown in FIGS. 9C and 9D in perspective and top views, respectively. As shown, the surface 950 is traced by sweeping a generating curve 962 (that has a straight portion 962a and an end 962b that is circularly curved at a radius $r_{962}$) about an axis L (that is transverse to the straight portion 962a) within an angular range $\beta$ defined by the limiting curves 960 and 964. While the curvature of the circular end of the generating curve remains unchanged with the sweeping angle, $r_{960b} = r_{962b} = r_{964b} = r$, a radius of the rotational movement itself is being changed as a predetermined function of the sweeping angle. For example, as shown in FIGS. 9C, 9D, the sweeping radius may be decreased from $R_{962a}$ to $R_{960a} < R_{962a}$ at one end of the sweeping range $\beta$ and from $R_{962a}$ to $R_{964a} < R_{962a}$ at another end of the sweeping range $\beta$. The resulting surface 950 contains two portions. A first portion of the surface 950 (in which the straight portions 960a, 962a, and 964a of the generating curves 960, 962, 964 lie) includes a flat region in the xy-plane. The remaining second portion of the surface 950 (which seamlessly adjoins the first portion along a curved breakline 972 lying in the xy-plane. It is appreciated that the resulting surface 950 does not constitute a segment or fragment of a rotationally-symmetric surface. The angular separation between the curves 960 and 960 may differ from that between the curves 962 and 964. It is also appreciated that, in a related embodiment (not shown), the reference surface may be formed by sweeping a generating curve such as, for example, the curve 962 as described in reference to FIGS. 9C, 9D while simultaneously changing the radius of sweeping (to form a flat portion of the reference surface) and the radius of curvature of the curved portion of the generating curve (to form an adjoining two-dimensionally curved portion of the reference surface).

Figure 5A:
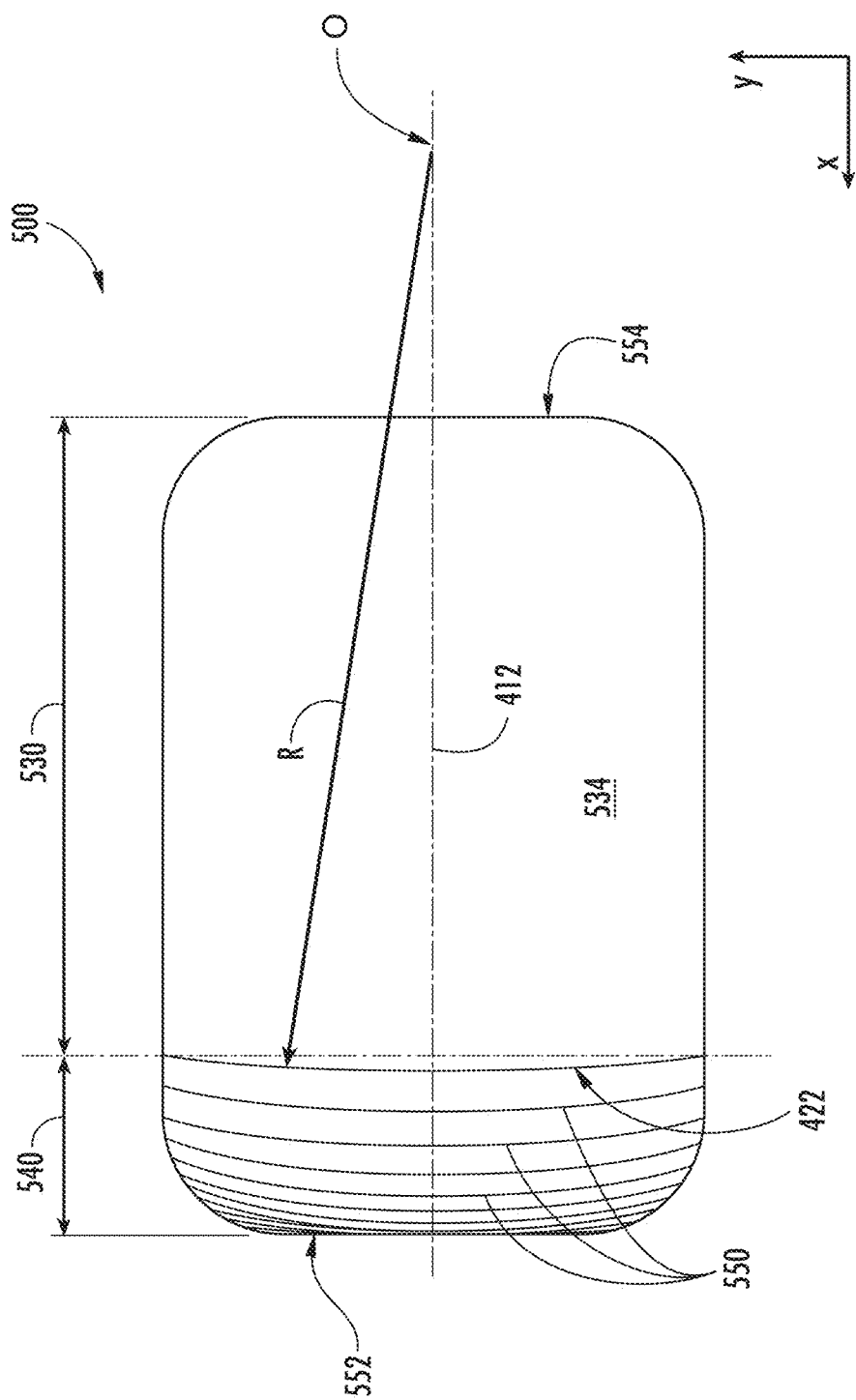
FIG. 5A is a top view of an embodiment of a reflector of the invention.

Referring now to FIG. 5A, which shows a top view of a mirror substrate 500, and in further reference to FIGS. 4A through 4C, a curved breakline such as a circular breakline 422 separates a first portion 530, of the surface 534 that has a flat surface area from its second surface portion 540 that is characterized by a two-dimensional curvature. The first and second portions 530, 540 adjoin along the breakline 422. The mirror substrate 500 is generally configured such that the horizontal axis of the mirror (corresponding to the x-axis in FIG. 5A) intersects the curved breakline 422 at an angle of 90+/−45 degrees. In one embodiment, the center of curvature O of the breakline 422 is located on a flat portion of the limiting curve 412 and the radius R of the breakline 422 is chosen to be within the range of 150 mm to 1000 mm, preferably 190 mm or greater, even more preferably 300 mm or greater. In one embodiment, for example, R=500 mm. It is appreciated that in a specific embodiment the curved breakline such as the breakline 422 may be non-circular. Lines 550 of FIG. 5A represent radii of the surface curvature in the horizontal direction. An outboard edge of the embodiment 500 is shown as 552, while an inboard edge is shown as 554.

Figure 5B:
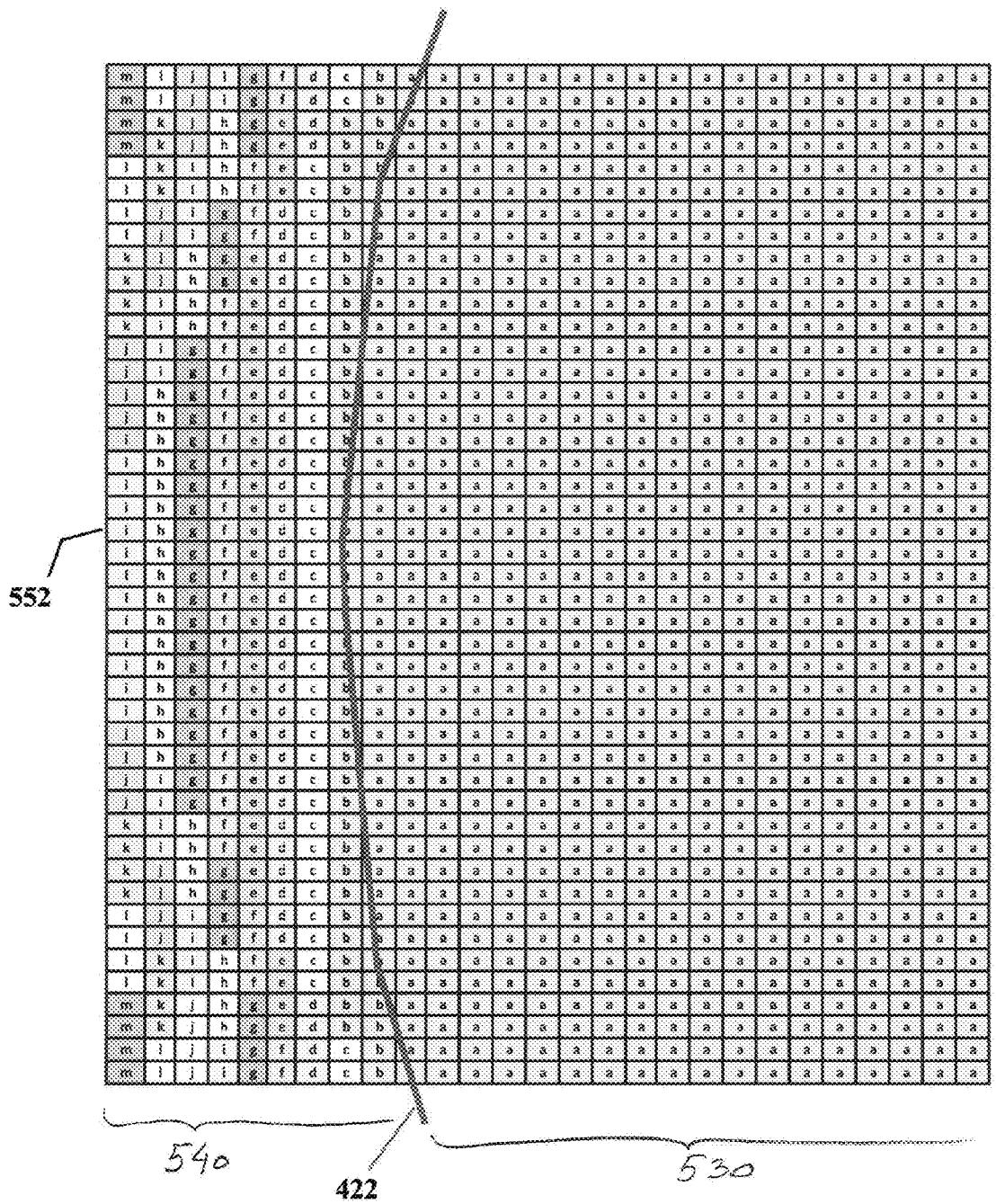
FIG. 5B is a map showing a two-dimensional distribution of optical power along the surface of the inboard portion of a reflector and a two-dimensional distribution of relative optical power ratio along the outboard portion of the surface, in accordance with an embodiment of the invention.

FIG. 5B schematically illustrates, in large spatial increments, a map or a distribution of optical power characteristics across the mirror surface 534 of the embodiment of FIG. 5A. For the comparison purposes, a distribution of optical power characteristics across the mirror surface of the related art embodiment of FIG. 3 is presented in FIG. 5C. Arbitrary color-coding has been added to the spatial cells or increments of the surfaces shown in FIGS. 5B and 5C to serve as an eye-guide in order to demonstrate a two-dimensional change of the optical power characteristics. As illustrated, the portion 530 located inboard with respect to the curved breakline 422 is substantially flat and not exhibiting any significant optical power or change in optical power, while the portion 540 located outboard with respect to the breakline 422 has an optical power ratio that is decreasing in value along a path from the breakline 422 towards the outboard edge 552. The distribution of an optical power ratio for the related art (see 300 of FIGS. 3, and 352 of FIG. 5C) on the other hand, is characterized by a constant optical power ratio in the region 340 located outboard with respect to the breakline 350.

Figure 5C:
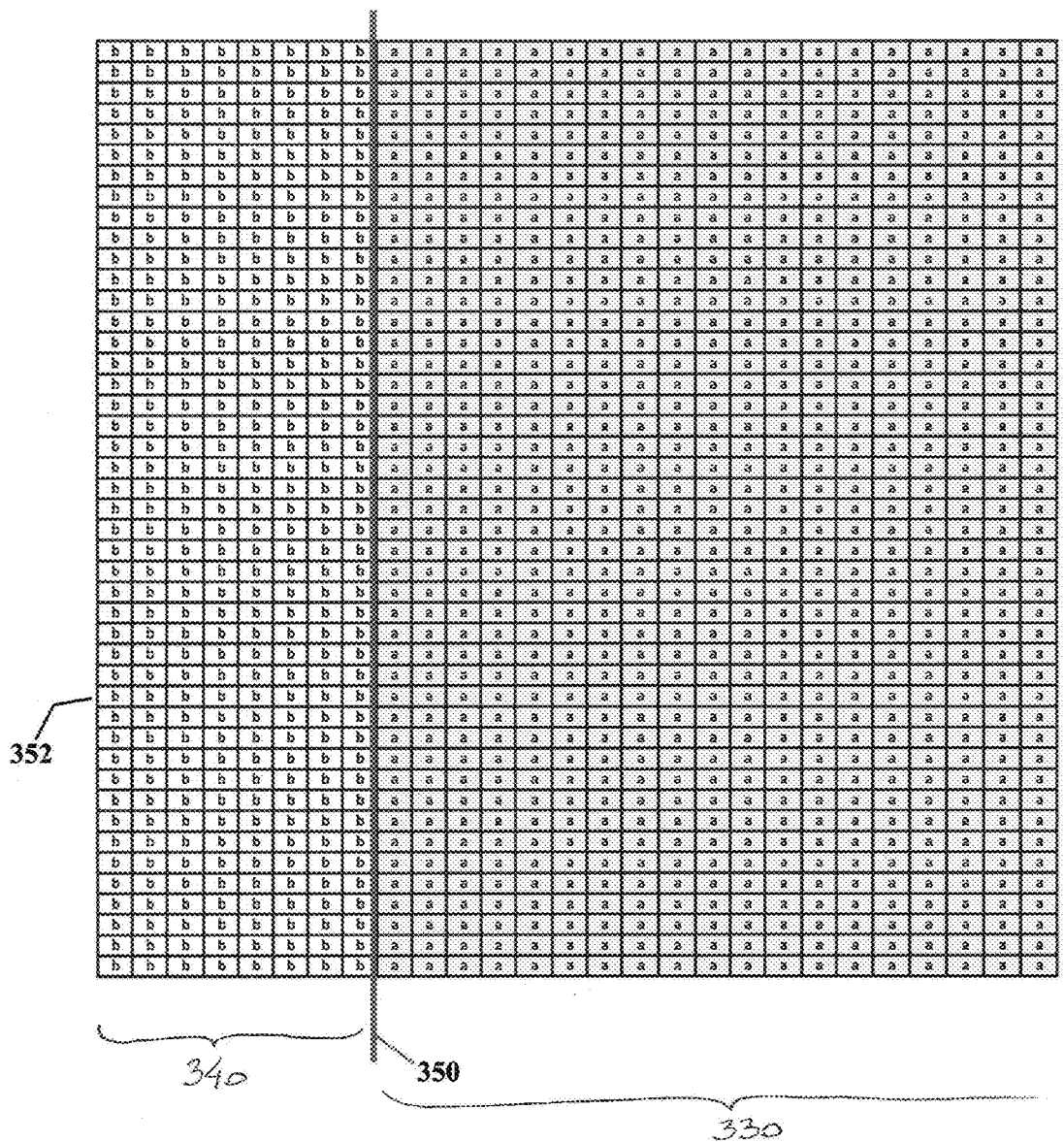
FIG. 5C is a map showing a two-dimensional distribution of optical power characteristics of a reflector of related art.

A legend describing the meaning of notations in FIGS. 5B and 5C is presented in Table 3. In reference to Table 3, FIG. 5B shows that the first surface portion 530 of the embodiment 500 has an on-average constant optical power within the range of +/−0.25 diopter. FIG. 5B also shows that a 2D-distribution of the optical power ratio, as defined above, outboard of the breakline does not exceed a value of about 1,000 across the two-dimensionally curved second surface portion 540 and is decreasing in value as one measures towards the outboard edge 552 of the mirror.

TABLE 3

| | Letter Designation for Optical Power or Optical Power Ratio | Measure of Optical Power or Optical Power Ratio | Units |
|---|---|---|---|
| 1 | −0.25 < a < 0.25 | | diopter (flat portion) |
| 2 | 1000 < b < infinity | | $P_{horiz}$ (diopter)/$P_{vert}$ (diopter) |
| 3 | c | <b | $P_{horiz}$ (diopter)/$P_{vert}$ (diopter) |
| 4 | d | <c | $P_{horiz}$ (diopter)/$P_{vert}$ (diopter) |
| 5 | E | <d | $P_{horiz}$ (diopter)/$P_{vert}$ (diopter) |

TABLE 3-continued

| | Letter Designation for Optical Power or Optical Power Ratio | Measure of Optical Power or Optical Power Ratio | Units |
|---|---|---|---|
| 6 | F | <e | $P_{horiz}$ (diopter)/$P_{vert}$ (diopter) |
| 7 | G | <f | $P_{horiz}$ (diopter)/$P_{vert}$ (diopter) |
| 8 | H | <g | $P_{horiz}$ (diopter)/$P_{vert}$ (diopter) |
| 9 | I | <h | $P_{horiz}$ (diopter)/$P_{vert}$ (diopter) |
| 10 | J | <i | $P_{horiz}$ (diopter)/$P_{vert}$ (diopter) |
| 11 | K | <j | $P_{horiz}$ (diopter)/$P_{vert}$ (diopter) |
| 12 | L | <k | $P_{horiz}$ (diopter)/$P_{vert}$ (diopter) |
| 13 | M | <l | $P_{horiz}$ (diopter)/$P_{vert}$ (diopter) |

An FOM such as the optical power ratio used in the present application can be measured in various ways. By mapping a given surface in a three-dimensional space, a grid of data points (x,y,z) may be obtained and used to determine the optical power of the surface in the vicinity of each of the chosen points along the surface, in any two directions (for example, in the horizontal and vertical directions, as defined herein). For example, for a chosen point and any two neighboring points on the surface, a circumscribed circle can be appropriately defined, the radius of which is reciprocally related to the value of optical power of the surface in the vicinity of the chosen point. The process of mapping should allow for uneven spacing of the grid of measured data, thus facilitating a determination of whether the sought optical power value is positive or negative, respectively rendering the surface concave or convex in the vicinity of the chosen point. In one embodiment of the mapping process, this can be accomplished by determining whether the chosen point lies above or below the level defined by a line connecting the two neighboring points.

Figure 6A:
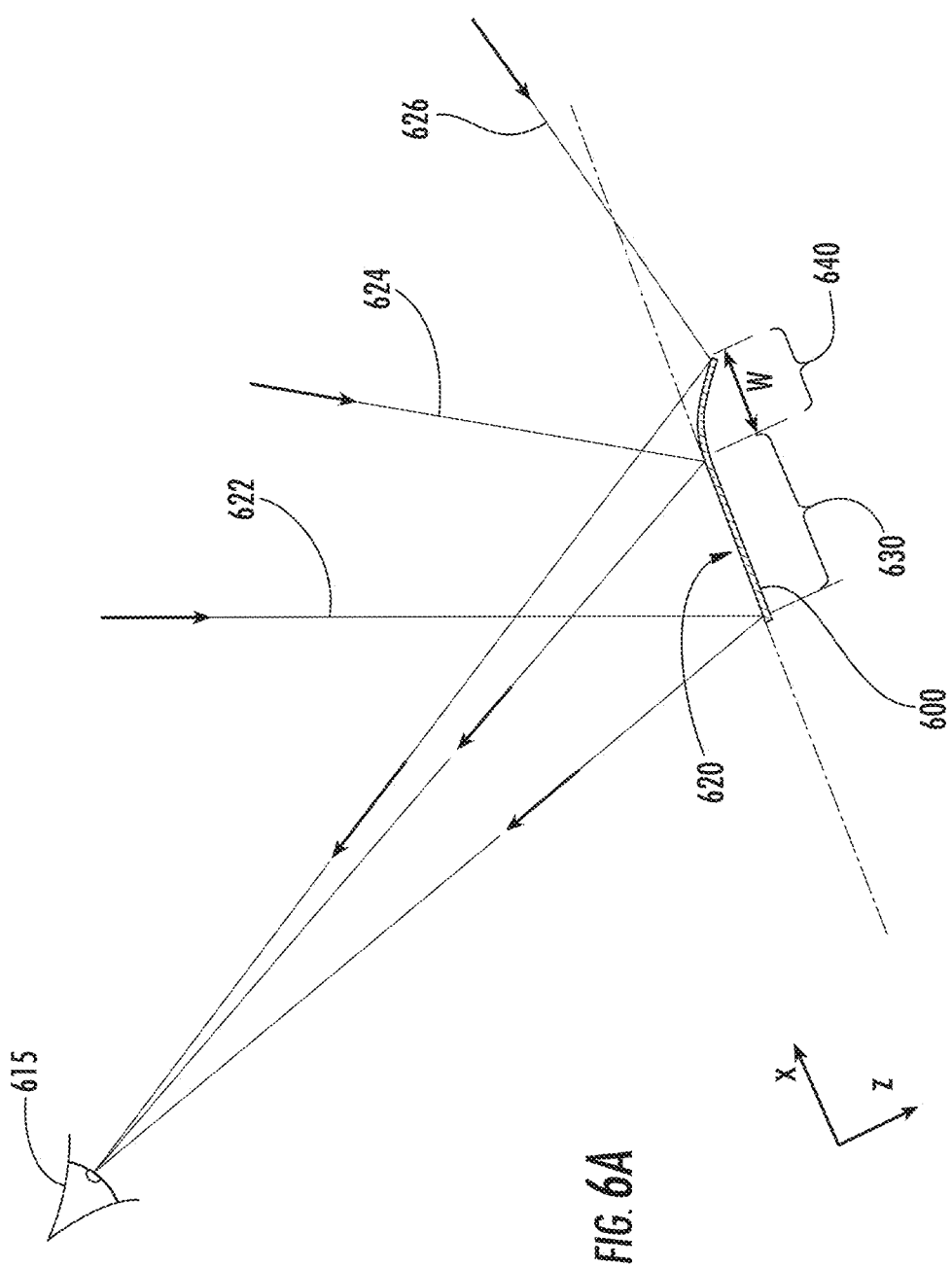
FIG. 6A is a side view of one embodiment of the invention illustrating a field-of-view that is increased as compared with that of a conventional flat mirror depicted in FIG. 6B.
Figure 6B:
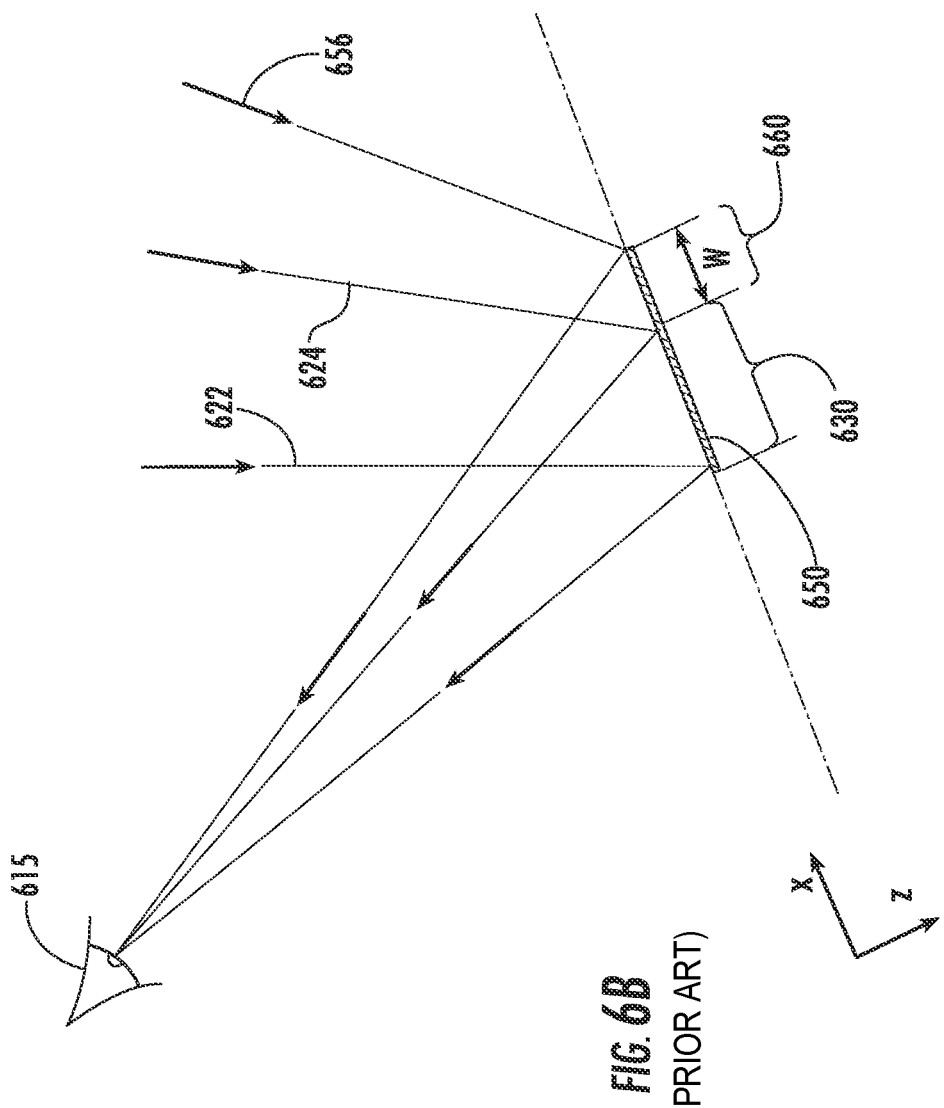
FIG. 6B is a side view of a flat mirror from the prior art for purposes of illustrating a corresponding field-of-view.

Characterizing an embodiment of the present invention further, FIG. 6A schematically illustrates the increase of the horizontal FOV. As shown, the FOV available to a viewer 615 increases with the repositioning of the viewing point in the horizontal direction, from the inboard portions of the mirror towards its outboard, along an image-forming surface 620 of the embodiment 600. In particular, the angles of reflection of incoming light rays 622, 624, and 626 striking the surface 620 in the inboard portion 630, in the vicinity of the breakline (not shown) and in an outboard portion 640, are continuously and progressively increasing. It is appreciated that, generally, the increase of FOV due to the presence of the outboard portion of the mirror of one or more embodiments of the present invention as compared with the FOV of the flat inboard portion 630 alone is a function of the horizontal extent w of the outboard portion 640. The FOV of the mirror may be about 20° for a mirror having w of about 20 mm, about 26° for that with w=32 mm, about 29° for a mirror with w=38 mm, and about 32° for a mirror with w=44 mm. In one embodiment, the FOV of an ORM is increasing, in horizontal direction, at a rate of about 3° per 6 mm increase in width of the curved outboard portion of the mirror. A side-by-side comparison of the embodiment 600 of FIG. 6A with a conventional flat mirror 650 of FIG. 6B, having an equally sized (w) but flat outboard portion 660, demonstrates that, conditions being the same, the full FOV of the conventional mirror 650 defined by the angles of reflection if the light beams 622 and 656 incident at the inboard and outboard edges of the mirror is less than that of the embodiment 600, and typically does not exceed about 18° or so.

Figure 10:
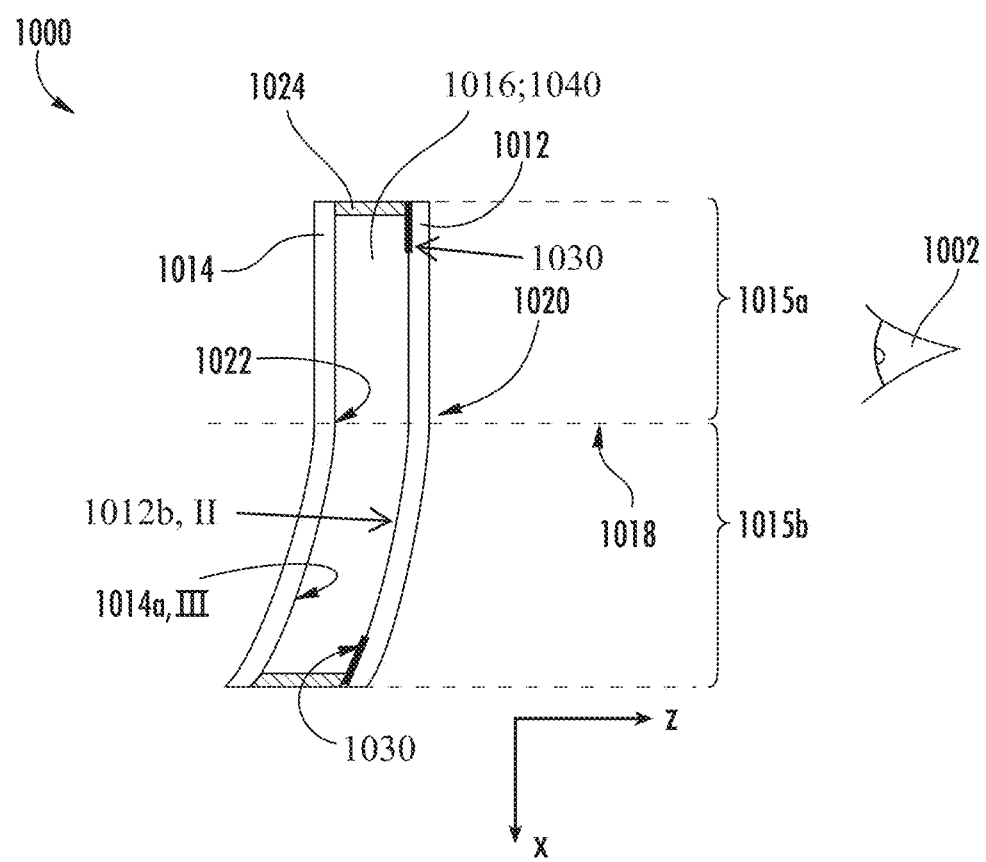
FIG. 10 is a schematic cross section of an EC-element having substrates with spatially-conforming fiducial surfaces according to an embodiment of the invention.

While the examples of a mirror substrates described above referred to a single surface defining the mirror, it is understood that, in practice, any reflector or a mirror structure containing a fiducial surface configured in accordance with an embodiment of the present invention is within the scope of the invention. In fact, it should be understood that the individual aspects of the various embodiments as described above may be combined in a variety of ways and that each of these combinations and sub-combinations should be considered as part of the present invention. FIG. 10, for example, illustrates an embodiment 1000 of the invention (in cross-sectional view and in reference to the viewer 1002 in front of the embodiment) that includes an electrochromic (EC) element. The embodiment 1000 contains a first substrate 1012 defining a second surface 1012b (surface II) of the embodiment 1000 configured as a fiducial surface and conforming to a pre-fabricated surface of the present invention. The embodiment 1000 also contains a second substrate 1014 defining a third surface 1014a (surface III) of the embodiment 1000 that is likewise configured as a fiducial surface of the present invention and. Surfaces II and III, therefore, conform to one another and to the surface pre-fabricated according to one of the embodiments as discussed above, for example, in reference to FIGS. 4(A-F), 5(A, B), 9(A-D). The first and second substrates 1012, 1014 are disposed in a spaced-apart and substantially tangentially-parallel relationship such that a gap 1016 is formed between the curved second and third surfaces 1012b and 1014a and that the corresponding inboard and outboard portions 1015a, 1015b of each of the substrates 1012 and 1014 are appropriately aligned. The gap 1016 is filled with EC material 1040. In one embodiment, surfaces 1012b and 1014a are congruent. The first substrate 1012 carries a reflective coating 1030 configured as a circumferential ring and referred to in this application as a peripheral ring. The line 1018 indicates schematically the boundary between corresponding inboard and outboard portions 1015a, 1015b of the substrates 1012 and 1014. The respective breaklines 1020 and 1022, along which the outboard and inboard portions of each of the substrates seamlessly adjoin each other, are indicated only in side-view. It shall be appreciated that in an embodiment such as the embodiment 1000 it is rather critical to align the substrates 1012 and 1014 in such a fashion as to have the breaklines 1020 and 1022 be substantially aligned as viewed from in front of the mirror (by the viewer 1002), or be substantially coextensive in a plane that is parallel to a flat portion of either substrate. If the assembly of the EC-element such as the element 1000 of FIG. 10 substantially deviates from this rather stringent requirement, the misalignment between the substrates 1012 and 1014, especially between the curved portions of the fiducial surfaces 1012b and 1014a may possibly lead to the formation of a wedge between these surfaces and, consequently, to double-imaging detrimentally affecting the imaging properties of the embodiment of the mirror.

Figure 11:
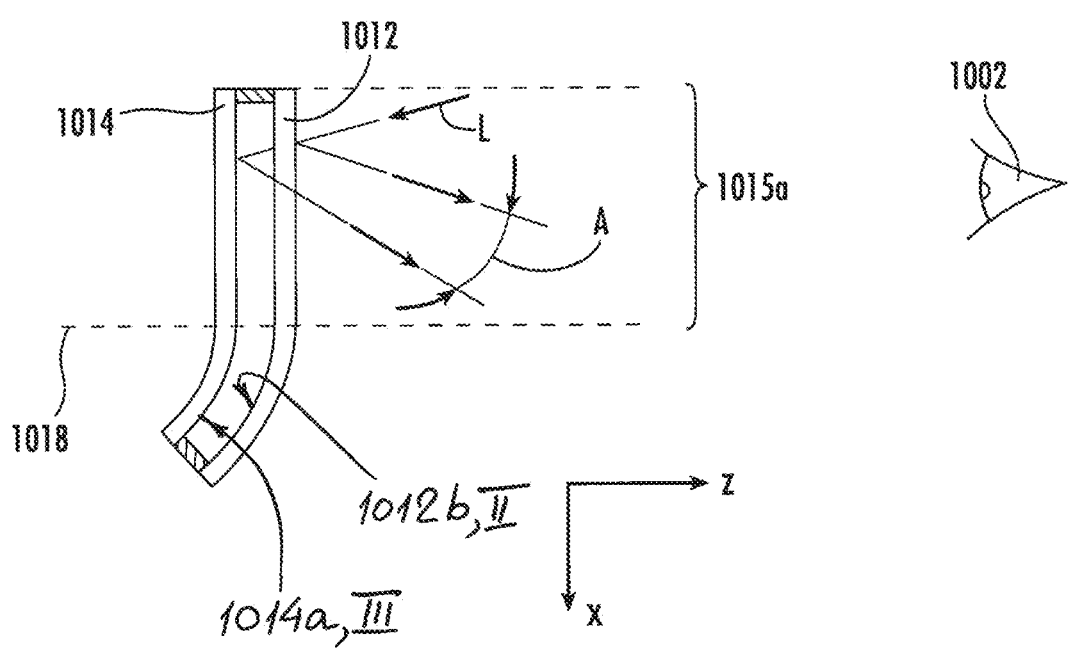
FIG. 11 is a schematic cross-section of the EC element of FIG. 10 illustrating angular alignment of substrates of the EC-element.

In one embodiment and in reference to FIG. 11, for example, the tangentially-parallel relationship between the congruent surfaces 1012b and 1014a of the EC-element substrates is satisfied when the angular deviation A between two beams of light, respectively formed by the surfaces 1012b and 1014b in reflecting a collimated beam of light L that is incident on the substantially flat inboard portion 1015a of the embodiment from the front (corresponding to the observer 1002), does not exceed 9 arcminutes. This deviation between the reflected beams corresponds to an angle of about 4.5 arcminutes between the flat inboard portions of the surfaces 1012b and 1014a. In a related embodiment, the tangentially-parallel relationship between the congruent surfaces 1012b, 1014a is satisfied as long as A is no greater than 12 arcminutes. Such deviation between the reflected beams corresponds to an angle of about 6 arcminutes between the flat inboard portions of the surfaces 1012b and 1014a.

In further general reference to FIGS. 10 and 11, an embodiment of the EC element of the present invention may include first and second substrates each of which contains a differentiable surface having a substantially flat portion and a 2D-curved portion, which adjoins the substantially flat portion along a curved line. Alternatively, an embodiment of the EC element may include first and second substrates each of which contains a differentiable surface having a substantially flat portion and a 1D-curved portion that adjoins the substantially flat portion along a straight line. In either embodiment, such first and second substrates assembled into a spaced-apart and tangentially-parallel relationship may be adapted to substantially coincide at all points when superimposed (in other words, to be substantially congruent).

As stated above in reference to FIG. 5B, it is important that the inboard portion (see, for example, 530 in FIG. 5A) be free from an aesthetically displeasing distortion in a reflected image. This is a challenge when attempting to provide an ORM that has a flat inboard portion and an outboard portion that has an optical power ratio decreasing as measured outboard from the breakline Controlling distortion is even more important in an EC element since there are two substrates that can contribute to the distortion. In addition, even if there is minimal distortion in each of the first and second substrate (such that each substrate may separately be sufficiently free from distortion so as to be commercially acceptable as an ORM), if those two substrates are assembled into an EC element a commercially unacceptable device can be produced. This is because it is necessary to closely match the profiles of the two substrates along the entire cell spacing, as described above. One embodiment of the present invention therefore provides an EC element having inboard portion that is free from aesthetically displeasing distortion by providing a first substrate having a first fiducial surface and a second substrate having a second fiducial surface, and wherein the first and second fiducial surfaces are aligned such that they are tangentially parallel along at least the inboard portion of the EC element, and more preferably along the entire surface of the EC element.

The gap 1016 is filled with an EC-medium and sealed with a peripherally disposed seal 1024 as known in the art. Various coatings including electrode layers conventionally disposed or carried on the second and third surfaces of the embodiment 1000, and reflecting and/or opacifying layers are not shown for simplicity of illustration. An embodiment may additionally incorporate a peripheral ring (of a spectral filter material) disposed on one of the surfaces of the first substrate 1012 in a manner known in the art to facilitate manipulation of color and/or irradiance of light (within the meaning of the Commission Internationale de l'Eclairage's, CIE, 1976 CIELAB Chromaticity Diagram) that are visually perceived and/or measured in reflection of incident ambient light off of the embodiment. An embodiment may also include other elements and components such as a light source at the back of the embodiment or a reflector-supporting structure, elements of the housing structure, and various electronics. Neither of these elements or components is shown in the figures for simplicity of illustration.

Furthermore, any embodiment of the present invention may be configured within a rearview assembly that additionally comprises various auxiliary devices such as, for example, at least one of an interior illumination assembly, a digital voice processing system, a power supply, a global positioning system, an exterior light control, a moisture sensor, an information display, a light sensor, a blind spot indicator, a turning signal indicator, an approach warning, an operator interface, a compass, a temperature indicator, a voice actuated device, a microphone, a dimming circuitry, a telecommunication system, a navigation aid, a lane departure warning system, an adaptive cruise control, a vision system, a rear vision system, a tunnel detection system, and a heater. It should be understood that the above description and the accompanying figures are for illustrative purposes and should in no way be construed as limiting the present invention to the particular embodiments shown and described. Embodiments of the present invention may be modified to include various additional laminated structures, transflective optics, optically polarizing elements or components such as, for example, an anisotropic polymer-based film, whether integrated within an embodiment or stand-alone, as taught in the Prior Applications. Alternatively or in addition, embodiments of the invention may include mirror elements containing thin-film coatings having graded thickness and/or multiple regions characterized by different optical characteristics. All these systems are considered to be within the scope of the present invention.

What is claimed is:

1. An optical reflector comprising:
    a primary optical element having a perimeter, a first substantially flat portion, and a second portion that is curved in two dimensions, the second portion adjoining said first portion along a curved line, wherein the first and second portions are within the perimeter, and further wherein each portion defines a primary differentiable surface; and
    a layer of reflective material on said primary optical element.

2. An optical reflector according to claim 1, wherein the first portion has an optical power, averaged over the area of said first portion, which does not exceed 250 millidiopter, and wherein said curved line has a radius greater than 150 mm.

3. An optical reflector according to claim 2, wherein said optical power of the first portion changes at a rate not exceeding 250 millidiopter per 10 mm of displacement across said first portion.

4. An optical reflector according to claim 1, further comprising:
    a secondary optical element having a perimeter that defines a secondary differentiable surface and disposed next to the primary optical element such as to form a spaced-apart and tangentially-parallel relationship between the primary and secondary differentiable surfaces,
    wherein an angular deviation between two beams of light, formed by the reflectance of an incident collimated beam of light off of the primary and secondary differentiable surfaces does not exceed 12 arcminutes.

5. An optical reflector according to claim 1, further comprising:
    a secondary optical element having a perimeter that defines a secondary differentiable surface and disposed next to the primary optical element such as to form a spaced-apart and tangentially-parallel relationship between the primary and secondary differentiable surfaces,
    wherein an angular deviation between two beams of light, formed by the reflectance of an incident collimated beam of light off of the primary and secondary differentiable surfaces does not exceed 9 arcminutes.

6. An optical reflector according to claim 1, wherein the optical reflector is further configured as part of a rearview assembly that comprises at least one of a light source positioned to project light through the primary optical element, a blind spot indicator, a keyhole illuminator, a puddle light, a turn signal, a photo sensor, an illumination assembly, a display, a telemetry system, and a heater.

7. An optical reflector according to claim 1, wherein the first substantially flat portion is configured to meet the requirements of the National Highway Traffic Safety Administration set forth in 49 C.F.R. §571.111.

8. An optical reflector according to claim 1, wherein the curved line is non-circular.

9. An optical reflector according to claim 1, wherein the first portion has an optical power, averaged over the area of said first portion, which does not exceed 100 millidiopter.

10. An optical reflector according to claim 9, wherein said optical power of the first portion changes at a rate not exceeding 100 millidiopter per 10 mm of displacement across said first portion.

11. An optical reflector comprising:
    a primary optical element having a perimeter, a first substantially flat portion, and a second portion that is curved in two dimensions, the second portion adjoining said first portion along a breakline comprising a substantially circular arc having a radius of curvature, wherein the first and second portions are within the perimeter, and further wherein each portion defines a primary differentiable surface; and
    a layer of reflective material on said primary optical element.

12. An optical reflector according to claim 11, wherein the breakline comprises a center of curvature located on the first substantially flat portion.

13. An optical reflector according to claim 12, wherein the radius of curvature is within the range of 150 mm to 1000 mm.

14. An optical reflector according to claim 12, wherein the radius of curvature is within the range of 300 mm to 1000 mm.

15. An optical reflector according to claim 11, wherein the optical reflector is further configured as part of a rearview assembly that comprises at least one of a light source positioned to project light through the primary optical element, a blind spot indicator, a keyhole illuminator, a puddle light, a turn signal, a photo sensor, an illumination assembly, a display, a telemetry system, and a heater.

16. An optical reflector according to claim 11, wherein the first substantially flat portion is configured to meet the requirements of the National Highway Traffic Safety Administration set forth in 49 C.F.R. §571.111.

17. An optical reflector comprising:
    a primary optical element having a perimeter, a first substantially flat portion, and a second portion that is curved, the second portion adjoining said first portion along a straight breakline, wherein the first and second portions are within the perimeter, and further wherein each portion defines a primary differentiable surface; and
    a layer of reflective material on said primary optical element,
    wherein the first substantially flat portion is configured to meet the requirements of the National Highway Traffic Safety Administration set forth in 49 C.F.R. §571.111.

18. An optical reflector according to claim 17, wherein the optical reflector is further configured as part of a rearview assembly that comprises at least one of a light source positioned to project light through the primary optical element, a blind spot indicator, a keyhole illuminator, a puddle light, a turn signal, a photo sensor, an illumination assembly, a display, a telemetry system, and a heater.

19. An optical reflector according to claim 17, wherein the second portion is curved in one dimension.

* * * * *